(12) United States Patent
Hustedt

(10) Patent No.: US 11,967,913 B2
(45) Date of Patent: Apr. 23, 2024

(54) METHOD AND APPARATUS TO DRIVE COILS OF A MULTIPHASE ELECTRIC MACHINE

(71) Applicant: Exro Technologies Inc., Calgary (CA)

(72) Inventor: Eric Hustedt, Calgary (CA)

(73) Assignee: Exro Technologies Inc., Calgary (CA)

( * ) Notice: Subject to any disclaimer, the term of this patent is extended or adjusted under 35 U.S.C. 154(b) by 0 days.

(21) Appl. No.: 17/742,727

(22) Filed: May 12, 2022

(65) Prior Publication Data
US 2022/0368259 A1    Nov. 17, 2022

Related U.S. Application Data

(60) Provisional application No. 63/188,151, filed on May 13, 2021.

(51) Int. Cl.
*H02P 25/18* (2006.01)
*H02P 23/28* (2016.01)
*H02P 25/02* (2016.01)

(52) U.S. Cl.
CPC .............. *H02P 23/28* (2016.02); *H02P 25/02* (2013.01)

(58) Field of Classification Search
CPC ........... H02P 23/28; H02P 25/02; H02P 27/08
See application file for complete search history.

(56) References Cited

U.S. PATENT DOCUMENTS

| | | | |
|---|---|---|---|
| 757,394 A | 4/1904 | Eickemeyer et al. | |
| 908,097 A | 12/1908 | Herz | |
| 1,980,808 A | 11/1934 | Leibing | |
| 2,091,190 A | 8/1937 | Tullio | |
| 2,189,524 A | 2/1940 | Randolph et al. | |
| 2,333,575 A | 11/1943 | Kilgore et al. | |
| 2,407,883 A | 9/1946 | Corwill | |
| 2,430,886 A | 11/1947 | Glen | |
| 2,432,117 A | 12/1947 | Morton | |
| 2,488,729 A | 11/1949 | Kooyman | |
| 2,504,681 A | 4/1950 | Hall | |

(Continued)

FOREIGN PATENT DOCUMENTS

| | | |
|---|---|---|
| AU | 2018101036 A4 | 10/2018 |
| BR | PI0415663 A | 12/2006 |

(Continued)

OTHER PUBLICATIONS

International Search Report and Written Opinion dated Jul. 12, 2022 in PCT/CA2022/050620, 15 pages.

(Continued)

*Primary Examiner* — Muhammad S Islam
(74) *Attorney, Agent, or Firm* — Cozen O'Connor

(57) ABSTRACT

Disclosed is a series mode modulation configuration and a parallel voltage equivalent modulation configuration. In the series mode modulation configuration a unipolar modulation is utilized. Unipolar modulation utilizes a zero vector and produces a voltage across the load with a frequency factor of 2×. In the parallel voltage equivalent mode modulation configuration there are two H bridges driving two coils with identical current. The H bridges can advantageously be operated out of phase with one another (e.g., 180 out of phase with one another to interleave the currents to further reduce ripple current stress.

17 Claims, 11 Drawing Sheets

(56) References Cited

U.S. PATENT DOCUMENTS

| | | |
|---|---|---|
| 2,516,114 A | 7/1950 | Green |
| 2,601,517 A | 6/1952 | Hammes |
| 2,680,822 A | 6/1954 | Brainard |
| 2,719,931 A | 10/1955 | William |
| 3,083,311 A | 3/1963 | Shelley |
| 3,149,256 A | 9/1964 | Walter |
| 3,153,157 A | 10/1964 | Erich |
| 3,169,203 A | 2/1965 | Lavin et al. |
| 3,223,865 A | 12/1965 | Lewis |
| 3,237,034 A | 2/1966 | Shelley |
| 3,293,470 A | 12/1966 | Richard |
| 3,411,027 A | 11/1968 | Heinz |
| 3,482,156 A | 12/1969 | Porath |
| 3,549,925 A | 12/1970 | Johnson |
| 3,621,370 A | 11/1971 | Vandervort |
| 3,713,015 A | 1/1973 | Frister |
| 3,801,844 A | 4/1974 | Steele |
| 3,809,936 A | 5/1974 | Klein |
| 3,870,928 A | 3/1975 | Allen |
| 3,903,863 A | 9/1975 | Katsumata |
| 3,942,913 A | 3/1976 | Bokelman |
| 3,944,855 A | 3/1976 | Le |
| 3,965,669 A | 6/1976 | Larson et al. |
| 3,973,137 A | 8/1976 | Drobina |
| 3,973,501 A | 8/1976 | Briggs |
| 3,984,750 A | 10/1976 | Pfeffer et al. |
| 3,992,641 A | 11/1976 | Heinrich et al. |
| 4,001,887 A | 1/1977 | Platt et al. |
| 4,004,426 A | 1/1977 | Laing |
| 4,013,937 A | 3/1977 | Pelly et al. |
| 4,015,174 A | 3/1977 | Cotton |
| 4,020,369 A | 4/1977 | Shoupp et al. |
| 4,023,751 A | 5/1977 | Richard |
| 4,035,701 A | 7/1977 | Jensen |
| 4,039,848 A | 8/1977 | Winderl |
| 4,050,295 A | 9/1977 | Harvey |
| 4,051,402 A | 9/1977 | Gruber |
| 4,074,159 A | 2/1978 | Robison |
| 4,074,180 A | 2/1978 | Sharpe et al. |
| 4,081,726 A | 3/1978 | Brimer et al. |
| 4,095,922 A | 6/1978 | Farr |
| 4,100,743 A | 7/1978 | Trumbull et al. |
| 4,107,987 A | 8/1978 | Robbins et al. |
| 4,126,933 A | 11/1978 | Anderson et al. |
| 4,141,331 A | 2/1979 | Mallory |
| 4,142,696 A | 3/1979 | Nottingham |
| 4,142,969 A | 3/1979 | Funk et al. |
| 4,151,051 A | 4/1979 | Evans |
| 4,155,252 A | 5/1979 | Morrill |
| 4,159,496 A | 6/1979 | Stevens |
| 4,167,692 A | 9/1979 | Sekiya et al. |
| 4,168,459 A | 9/1979 | Roesel |
| 4,179,633 A | 12/1979 | Kelly |
| 4,181,468 A | 1/1980 | Kent et al. |
| 4,187,441 A | 2/1980 | Oney |
| 4,191,893 A | 3/1980 | Grana et al. |
| 4,196,572 A | 4/1980 | Hunt |
| 4,203,710 A | 5/1980 | Farr |
| 4,211,945 A | 7/1980 | Tawse |
| 4,215,426 A | 7/1980 | Klatt |
| 4,237,391 A | 12/1980 | Schur et al. |
| 4,245,601 A | 1/1981 | Crowder |
| 4,246,490 A | 1/1981 | Keramati et al. |
| 4,247,785 A | 1/1981 | Apgar |
| 4,253,031 A | 2/1981 | Frister |
| 4,254,344 A | 3/1981 | Fancy et al. |
| 4,260,901 A | 4/1981 | Woodbridge |
| 4,261,312 A | 4/1981 | Hart |
| 4,261,562 A | 4/1981 | Flavell |
| 4,276,481 A | 6/1981 | Parker |
| 4,286,581 A | 9/1981 | Atkinson |
| 4,289,970 A | 9/1981 | Deibert |
| 4,291,235 A | 9/1981 | Bergey et al. |
| 4,297,604 A | 10/1981 | Tawse |
| 4,302,683 A | 11/1981 | Burton |
| 4,305,031 A | 12/1981 | Wharton |
| 4,308,479 A | 12/1981 | Richter |
| 4,313,080 A | 1/1982 | Park |
| 4,316,096 A | 2/1982 | Syverson |
| 4,317,437 A | 3/1982 | Lindgren |
| 4,322,667 A | 3/1982 | Ohba |
| 4,329,138 A | 5/1982 | Riordan |
| 4,338,557 A | 7/1982 | Wanlass |
| 4,339,704 A | 7/1982 | McSparran et al. |
| 4,340,822 A | 7/1982 | Gregg |
| 4,355,276 A | 10/1982 | Vittay |
| 4,358,693 A | 11/1982 | Palmer et al. |
| 4,364,005 A | 12/1982 | Kohzai et al. |
| 4,373,488 A | 2/1983 | Neuhalfen |
| 4,385,246 A | 5/1983 | Schur et al. |
| 4,389,691 A | 6/1983 | Hancock |
| 4,394,720 A | 7/1983 | Gabor |
| 4,402,524 A | 9/1983 | D'Antonio et al. |
| 4,406,950 A | 9/1983 | Roesel |
| 4,412,170 A | 10/1983 | Roesel |
| 4,419,617 A | 12/1983 | Reitz |
| 4,433,280 A | 2/1984 | Lindgren |
| 4,433,355 A | 2/1984 | Chew et al. |
| 4,434,389 A | 2/1984 | Langley et al. |
| 4,434,617 A | 3/1984 | Walsh |
| 4,444,444 A | 4/1984 | Benedetti et al. |
| 4,446,377 A | 5/1984 | Kure-Jensen et al. |
| 4,454,865 A | 6/1984 | Tammen |
| 4,456,858 A | 6/1984 | Loven |
| 4,458,489 A | 7/1984 | Walsh |
| 4,459,536 A | 7/1984 | Wirtz |
| 4,473,751 A | 9/1984 | Rombach et al. |
| 4,477,745 A | 10/1984 | Lux |
| 4,503,368 A | 3/1985 | Sakamoto |
| 4,511,805 A | 4/1985 | Boy-Marcotte et al. |
| 4,513,576 A | 4/1985 | Dibrell et al. |
| RE31,947 E | 7/1985 | Farr |
| 4,532,431 A | 7/1985 | Iliev et al. |
| 4,532,460 A | 7/1985 | Gale et al. |
| 4,535,263 A | 8/1985 | Avery |
| 4,536,668 A | 8/1985 | Boyer |
| 4,536,672 A | 8/1985 | Kanayama et al. |
| 4,539,485 A | 9/1985 | Neuenschwander |
| 4,549,121 A | 10/1985 | Gale |
| 4,562,398 A | 12/1985 | Kotlarewsky |
| 4,575,671 A | 3/1986 | Lee et al. |
| 4,578,609 A | 3/1986 | McCarty |
| 4,581,999 A | 4/1986 | Campagnuolo et al. |
| 4,591,746 A | 5/1986 | Kamiyama |
| 4,593,289 A | 6/1986 | Newcomb |
| 4,598,240 A | 7/1986 | Gale et al. |
| 4,599,551 A | 7/1986 | Wheatley et al. |
| 4,601,354 A | 7/1986 | Campbell et al. |
| 4,605,874 A | 8/1986 | Whiteley |
| 4,628,219 A | 12/1986 | Troscinski |
| 4,630,817 A | 12/1986 | Buckley |
| 4,638,224 A | 1/1987 | Gritter |
| 4,639,647 A | 1/1987 | Posma |
| 4,641,080 A | 2/1987 | Glennon et al. |
| 4,642,031 A | 2/1987 | Farr |
| 4,642,988 A | 2/1987 | Benson |
| 4,644,233 A | 2/1987 | Suzuki |
| 4,654,066 A | 3/1987 | Garcia et al. |
| 4,654,537 A | 3/1987 | Gaspard |
| 4,656,379 A | 4/1987 | McCarty |
| 4,658,166 A | 4/1987 | Oudet |
| 4,658,346 A | 4/1987 | Templeton |
| 4,664,685 A | 5/1987 | Young |
| 4,668,885 A | 5/1987 | Scheller |
| 4,674,199 A | 6/1987 | Lakic |
| 4,675,591 A | 6/1987 | Pleiss |
| 4,678,954 A | 7/1987 | Takeda et al. |
| 4,682,067 A | 7/1987 | Oudet |
| 4,687,945 A | 8/1987 | Ebeling |
| 4,692,675 A | 9/1987 | Falk |
| 4,698,538 A | 10/1987 | Yoshida |
| 4,698,562 A | 10/1987 | Gale et al. |
| 4,710,667 A | 12/1987 | Whiteley |
| 4,713,569 A | 12/1987 | Schwartz |

(56) References Cited

U.S. PATENT DOCUMENTS

| | | |
|---|---|---|
| 4,729,218 A | 3/1988 | Haselbauer et al. |
| 4,737,070 A | 4/1988 | Horiuchi et al. |
| 4,739,203 A | 4/1988 | Miyao et al. |
| 4,772,842 A | 9/1988 | Ghosh |
| 4,779,038 A | 10/1988 | Eckerfeld |
| 4,783,028 A | 11/1988 | Olson |
| 4,783,038 A | 11/1988 | Gilbert et al. |
| 4,785,228 A | 11/1988 | Goddard |
| 4,806,812 A | 2/1989 | Masterman |
| 4,809,510 A | 3/1989 | Gaspard et al. |
| 4,811,091 A | 3/1989 | Morrison et al. |
| 4,814,651 A | 3/1989 | Elris et al. |
| 4,819,361 A | 4/1989 | Boharski |
| 4,831,300 A | 5/1989 | Lindgren |
| 4,835,433 A | 5/1989 | Brown |
| 4,843,270 A | 6/1989 | Dijken |
| 4,845,749 A | 7/1989 | Brickell et al. |
| 4,851,703 A | 7/1989 | Means |
| 4,862,021 A | 8/1989 | Larocca |
| 4,864,151 A | 9/1989 | Wyczalek et al. |
| 4,866,321 A | 9/1989 | Blanchard et al. |
| 4,872,805 A | 10/1989 | Horiuchi et al. |
| 4,874,346 A | 10/1989 | Wachspress |
| 4,876,991 A | 10/1989 | Galitello |
| 4,879,045 A | 11/1989 | Eggerichs |
| 4,879,484 A | 11/1989 | Huss |
| 4,879,501 A | 11/1989 | Haner |
| 4,884,953 A | 12/1989 | Golben |
| 4,885,526 A | 12/1989 | Szabo |
| 4,890,049 A | 12/1989 | Auinger |
| 4,893,040 A | 1/1990 | Turner et al. |
| 4,904,926 A | 2/1990 | Pasichinskyj |
| 4,906,877 A | 3/1990 | Ciaio |
| 4,914,412 A | 4/1990 | Engdahl et al. |
| 4,927,329 A | 5/1990 | Kliman et al. |
| 4,933,609 A | 6/1990 | Clark |
| 4,948,044 A | 8/1990 | Cacciatore |
| 4,950,973 A | 8/1990 | Kouba |
| 4,953,052 A | 8/1990 | Cartlidge et al. |
| 4,959,605 A | 9/1990 | Vaidya et al. |
| 4,963,780 A | 10/1990 | Hochstrasser |
| 4,973,868 A | 11/1990 | Wust |
| 4,977,529 A | 12/1990 | Gregg et al. |
| 4,980,595 A | 12/1990 | Arora |
| 4,985,875 A | 1/1991 | Mitchell |
| 4,994,700 A | 2/1991 | Bansal et al. |
| 5,002,020 A | 3/1991 | Kos |
| 5,003,209 A | 3/1991 | Huss et al. |
| 5,003,517 A | 3/1991 | Greer |
| 5,021,698 A | 6/1991 | Pullen et al. |
| 5,030,867 A | 7/1991 | Yamada et al. |
| 5,043,592 A | 8/1991 | Hochstrasser |
| 5,043,911 A | 8/1991 | Rashid |
| 5,047,680 A | 9/1991 | Toeroek |
| 5,053,662 A | 10/1991 | Richter |
| 5,053,732 A | 10/1991 | Elgass et al. |
| 5,057,726 A | 10/1991 | Mole et al. |
| 5,057,731 A | 10/1991 | Hancock |
| 5,058,833 A | 10/1991 | Carmouche |
| 5,065,305 A | 11/1991 | Rich |
| 5,072,145 A | 12/1991 | Davis et al. |
| 5,117,142 A | 5/1992 | Von |
| 5,120,332 A | 6/1992 | Wells |
| 5,130,595 A | 7/1992 | Arora |
| 5,146,146 A | 9/1992 | Saemann |
| 5,155,375 A | 10/1992 | Holley |
| 5,164,826 A | 11/1992 | Dailey |
| 5,174,109 A | 12/1992 | Lampe |
| 5,184,040 A | 2/1993 | Lim |
| 5,184,458 A | 2/1993 | Lampe et al. |
| 5,191,256 A | 3/1993 | Reiter et al. |
| 5,208,498 A | 5/1993 | Hamajima |
| 5,220,223 A | 6/1993 | Mehnert |
| 5,220,232 A | 6/1993 | Rigney et al. |
| 5,225,712 A | 7/1993 | Erdman |
| 5,227,702 A | 7/1993 | Nahirney |
| 5,237,815 A | 8/1993 | McArthur |
| 5,237,817 A | 8/1993 | Bornemisza et al. |
| 5,258,697 A | 11/1993 | Ford et al. |
| 5,267,129 A | 11/1993 | Anderson |
| 5,270,635 A | 12/1993 | Hoffman et al. |
| 5,281,094 A | 1/1994 | McCarty et al. |
| 5,283,488 A | 2/1994 | Ponnappan et al. |
| 5,289,041 A | 2/1994 | Holley |
| 5,289,072 A | 2/1994 | Lange |
| 5,306,972 A | 4/1994 | Hokanson et al. |
| 5,317,498 A | 5/1994 | Dhyandchand et al. |
| 5,336,933 A | 8/1994 | Ernster |
| 5,346,370 A | 9/1994 | Krohn |
| 5,355,044 A | 10/1994 | Uchida et al. |
| 5,369,324 A | 11/1994 | Saether |
| 5,370,112 A | 12/1994 | Perkins |
| 5,371,426 A | 12/1994 | Nagate et al. |
| 5,397,922 A | 3/1995 | Paul et al. |
| 5,400,596 A | 3/1995 | Shlien |
| 5,406,186 A | 4/1995 | Fair |
| 5,409,435 A | 4/1995 | Daniels |
| 5,413,010 A | 5/1995 | Sakakibara et al. |
| 5,418,436 A | 5/1995 | Apuzzo |
| 5,427,194 A | 6/1995 | Miller |
| 5,433,175 A | 7/1995 | Hughes et al. |
| 5,448,123 A | 9/1995 | Nilson et al. |
| 5,468,378 A | 11/1995 | de la Torre Barreiro |
| 5,469,045 A | 11/1995 | Dove et al. |
| 5,473,205 A | 12/1995 | Haaland |
| 5,481,146 A | 1/1996 | Davey |
| 5,484,120 A | 1/1996 | Blakeley et al. |
| 5,489,290 A | 2/1996 | Furnish |
| 5,489,810 A | 2/1996 | Ferreira et al. |
| 5,496,238 A | 3/1996 | Taylor |
| 5,504,382 A | 4/1996 | Douglass et al. |
| 5,512,811 A | 4/1996 | Latos et al. |
| 5,517,822 A | 5/1996 | Haws et al. |
| 5,523,635 A | 6/1996 | Ferreira et al. |
| 5,523,637 A | 6/1996 | Miller |
| 5,530,307 A | 6/1996 | Horst |
| 5,568,005 A | 10/1996 | Davidson |
| 5,594,289 A | 1/1997 | Minato |
| 5,610,448 A | 3/1997 | Dattilo |
| 5,614,773 A | 3/1997 | Fabris |
| 5,619,423 A | 4/1997 | Scrantz |
| 5,625,241 A | 4/1997 | Ewing et al. |
| 5,625,276 A | 4/1997 | Scott et al. |
| 5,626,103 A | 5/1997 | Haws et al. |
| 5,637,934 A | 6/1997 | Fabris |
| 5,637,935 A | 6/1997 | Haaland |
| 5,641,276 A | 6/1997 | Heidelberg et al. |
| 5,650,679 A | 7/1997 | Boggs et al. |
| 5,653,135 A | 8/1997 | Miller et al. |
| 5,656,915 A | 8/1997 | Eaves |
| 5,659,300 A | 8/1997 | Dresselhuys et al. |
| 5,670,861 A | 9/1997 | Nor |
| 5,682,073 A | 10/1997 | Mizuno |
| 5,689,165 A | 11/1997 | Jones et al. |
| 5,689,175 A | 11/1997 | Hanson et al. |
| 5,690,209 A | 11/1997 | Kofoed |
| 5,696,413 A | 12/1997 | Woodbridge et al. |
| 5,696,419 A | 12/1997 | Rakestraw et al. |
| 5,699,218 A | 12/1997 | Kadah |
| 5,708,314 A | 1/1998 | Law |
| 5,709,103 A | 1/1998 | Williams |
| 5,710,474 A | 1/1998 | Mulgrave |
| 5,715,716 A | 2/1998 | Miller et al. |
| 5,717,316 A | 2/1998 | Kawai |
| 5,719,458 A | 2/1998 | Kawai |
| 5,720,194 A | 2/1998 | Miller et al. |
| 5,726,517 A | 3/1998 | Gueraud et al. |
| 5,731,649 A | 3/1998 | Caamano |
| 5,735,123 A | 4/1998 | Ehrig |
| 5,736,838 A | 4/1998 | Dove et al. |
| 5,744,896 A | 4/1998 | Kessinger et al. |
| 5,747,964 A | 5/1998 | Turnbull |
| 5,753,989 A | 5/1998 | Syverson et al. |
| 5,760,507 A | 6/1998 | Miller et al. |

(56) References Cited

U.S. PATENT DOCUMENTS

| | | |
|---|---|---|
| 5,762,584 A | 6/1998 | Daniels |
| 5,773,910 A | 6/1998 | Lange |
| 5,773,962 A | 6/1998 | Nor |
| 5,775,229 A | 7/1998 | Folk et al. |
| 5,777,413 A | 7/1998 | Nagata et al. |
| 5,784,267 A | 7/1998 | Koenig et al. |
| 5,785,137 A | 7/1998 | Reuyl |
| 5,793,137 A | 8/1998 | Smith |
| 5,799,484 A | 9/1998 | Nims |
| 5,801,454 A | 9/1998 | Leininger |
| 5,806,959 A | 9/1998 | Adams et al. |
| 5,833,211 A | 11/1998 | Berling |
| 5,833,440 A | 11/1998 | Berling |
| 5,838,085 A | 11/1998 | Roesel et al. |
| 5,838,138 A | 11/1998 | Henty |
| 5,839,508 A | 11/1998 | Tubel et al. |
| 5,844,342 A | 12/1998 | Taga et al. |
| 5,844,385 A | 12/1998 | Jones et al. |
| 5,850,111 A | 12/1998 | Haaland |
| 5,850,138 A | 12/1998 | Adams et al. |
| 5,850,351 A | 12/1998 | Lotfy et al. |
| 5,850,732 A | 12/1998 | Willis et al. |
| 5,867,004 A | 2/1999 | Drager et al. |
| 5,874,797 A | 2/1999 | Pinkerton |
| 5,886,450 A | 3/1999 | Kuehnle |
| 5,889,348 A | 3/1999 | Muhlberger et al. |
| 5,892,311 A | 4/1999 | Hayasaka |
| 5,893,343 A | 4/1999 | Rigazzi |
| 5,903,113 A | 5/1999 | Yamada et al. |
| 5,912,522 A | 6/1999 | Rivera |
| 5,917,295 A | 6/1999 | Mongeau |
| 5,923,111 A | 7/1999 | Eno et al. |
| 5,939,813 A | 8/1999 | Schoeb |
| 5,942,829 A | 8/1999 | Huynh |
| 5,945,766 A | 8/1999 | Kim et al. |
| 5,952,756 A | 9/1999 | Hsu et al. |
| 5,968,680 A | 10/1999 | Wolfe et al. |
| 5,973,436 A | 10/1999 | Mitcham |
| 5,982,070 A | 11/1999 | Caamano |
| 5,982,074 A | 11/1999 | Smith et al. |
| 5,990,590 A | 11/1999 | Roesel et al. |
| 5,997,252 A | 12/1999 | Miller |
| 5,998,902 A | 12/1999 | Sleder et al. |
| 6,002,192 A | 12/1999 | Krivospitski et al. |
| 6,005,786 A | 12/1999 | Bluemel et al. |
| 6,014,015 A | 1/2000 | Thorne et al. |
| 6,020,711 A | 2/2000 | Rubertus et al. |
| 6,027,429 A | 2/2000 | Daniels |
| 6,032,459 A | 3/2000 | Skowronski |
| 6,034,463 A | 3/2000 | Hansson |
| 6,037,672 A | 3/2000 | Grewe |
| 6,037,696 A | 3/2000 | Sromin et al. |
| 6,043,579 A | 3/2000 | Hill |
| 6,047,104 A | 4/2000 | Cheng |
| 6,055,163 A | 4/2000 | Wagner et al. |
| 6,057,622 A | 5/2000 | Hsu |
| 6,062,016 A | 5/2000 | Edelman |
| 6,064,122 A | 5/2000 | McConnell |
| 6,065,281 A | 5/2000 | Shekleton et al. |
| 6,066,898 A | 5/2000 | Jensen |
| 6,066,906 A | 5/2000 | Kalsi |
| 6,081,053 A | 6/2000 | Maegawa et al. |
| 6,082,112 A | 7/2000 | Shekleton |
| 6,086,250 A | 7/2000 | Rouhet et al. |
| 6,087,750 A | 7/2000 | Raad |
| 6,093,293 A | 7/2000 | Haag et al. |
| 6,093,986 A | 7/2000 | Windhorn |
| 6,097,104 A | 8/2000 | Russell |
| 6,100,809 A | 8/2000 | Novoselsky et al. |
| 6,104,097 A | 8/2000 | Lehoczky |
| 6,104,115 A | 8/2000 | Offringa et al. |
| 6,105,630 A | 8/2000 | Braun et al. |
| 6,109,222 A | 8/2000 | Glezer et al. |
| 6,121,752 A | 9/2000 | Kitahara et al. |
| 6,125,625 A | 10/2000 | Lipinski et al. |
| 6,127,758 A | 10/2000 | Murry et al. |
| 6,149,410 A | 11/2000 | Cooper |
| 6,157,107 A | 12/2000 | Aoshima et al. |
| 6,158,953 A | 12/2000 | Lamont |
| 6,166,473 A | 12/2000 | Hayasaka |
| 6,169,332 B1 | 1/2001 | Taylor et al. |
| 6,170,251 B1 | 1/2001 | Skowronski et al. |
| 6,172,429 B1 | 1/2001 | Russell |
| 6,172,440 B1 | 1/2001 | Sasaki et al. |
| 6,175,210 B1 | 1/2001 | Schwartz et al. |
| 6,177,735 B1 | 1/2001 | Chapman et al. |
| 6,178,751 B1 | 1/2001 | Shekleton et al. |
| 6,181,235 B1 | 1/2001 | Smith |
| 6,189,621 B1 | 2/2001 | Vail |
| 6,191,561 B1 | 2/2001 | Bartel |
| 6,194,802 B1 | 2/2001 | Rao |
| 6,195,869 B1 | 3/2001 | Pullen et al. |
| 6,198,174 B1 | 3/2001 | Nims et al. |
| 6,199,381 B1 | 3/2001 | Unger et al. |
| 6,199,519 B1 | 3/2001 | Van |
| 6,211,633 B1 | 4/2001 | Jones et al. |
| 6,215,206 B1 | 4/2001 | Chitayat |
| 6,218,760 B1 | 4/2001 | Sakuragi et al. |
| 6,226,990 B1 | 5/2001 | Conrad |
| 6,242,827 B1 | 6/2001 | Wolf et al. |
| 6,242,840 B1 | 6/2001 | Denk et al. |
| 6,244,034 B1 | 6/2001 | Taylor et al. |
| 6,246,138 B1 | 6/2001 | Nims |
| 6,255,743 B1 | 7/2001 | Pinkerton et al. |
| 6,265,846 B1 | 7/2001 | Flechsig et al. |
| 6,269,639 B1 | 8/2001 | Conrad |
| 6,269,640 B1 | 8/2001 | Conrad |
| 6,274,945 B1 | 8/2001 | Gilbreth et al. |
| 6,274,960 B1 | 8/2001 | Sakai et al. |
| 6,275,012 B1 | 8/2001 | Jabaji |
| 6,276,124 B1 | 8/2001 | Soh et al. |
| 6,279,318 B1 | 8/2001 | Conrad |
| 6,279,319 B1 | 8/2001 | Conrad |
| 6,284,106 B1 | 9/2001 | Haag et al. |
| 6,286,310 B1 | 9/2001 | Conrad |
| 6,288,467 B1 | 9/2001 | Lange et al. |
| 6,291,901 B1 | 9/2001 | Cefo |
| 6,293,101 B1 | 9/2001 | Conrad |
| 6,294,842 B1 | 9/2001 | Skowronski |
| 6,297,977 B1 | 10/2001 | Huggett et al. |
| 6,300,689 B1 | 10/2001 | Smalser |
| 6,307,278 B1 | 10/2001 | Nims et al. |
| 6,307,717 B1 | 10/2001 | Jeong |
| 6,309,268 B1 | 10/2001 | Mabru |
| 6,311,490 B1 | 11/2001 | Conrad |
| 6,311,491 B1 | 11/2001 | Conrad |
| 6,314,773 B1 | 11/2001 | Miller et al. |
| 6,329,783 B1 | 12/2001 | Vrionis et al. |
| 6,332,319 B1 | 12/2001 | Conrad |
| 6,336,326 B1 | 1/2002 | Conrad |
| 6,339,271 B1 | 1/2002 | Noble et al. |
| 6,345,666 B1 | 2/2002 | Conrad |
| 6,348,683 B1 | 2/2002 | Verghese et al. |
| 6,362,718 B1 | 3/2002 | Patrick et al. |
| 6,363,706 B1 | 4/2002 | Meister et al. |
| 6,370,928 B1 | 4/2002 | Chies et al. |
| 6,373,162 B1 | 4/2002 | Liang et al. |
| 6,373,230 B2 | 4/2002 | Jabaji |
| 6,380,648 B1 | 4/2002 | Hsu |
| 6,384,564 B1 | 5/2002 | Pollock |
| 6,397,946 B1 | 6/2002 | Vail |
| 6,405,522 B1 | 6/2002 | Pont et al. |
| 6,407,465 B1 | 6/2002 | Peltz et al. |
| 6,411,003 B1 | 6/2002 | Sasaki et al. |
| 6,420,852 B1 | 7/2002 | Sato |
| 6,435,925 B1 | 8/2002 | Mabru |
| 6,438,937 B1 | 8/2002 | Pont et al. |
| 6,445,101 B2 | 9/2002 | Ley |
| 6,445,105 B1 | 9/2002 | Kliman et al. |
| 6,453,658 B1 | 9/2002 | Willis et al. |
| 6,454,920 B1 | 9/2002 | Haag et al. |
| 6,455,964 B1 | 9/2002 | Nims |
| 6,455,970 B1 | 9/2002 | Shaefer et al. |
| 6,463,730 B1 | 10/2002 | Keller et al. |

(56) References Cited

U.S. PATENT DOCUMENTS

| | | |
|---|---|---|
| 6,467,725 B1 | 10/2002 | Coles et al. |
| 6,470,933 B1 | 10/2002 | Volpi |
| 6,479,534 B1 | 11/2002 | Bentley et al. |
| 6,483,222 B2 | 11/2002 | Pelrine et al. |
| 6,486,640 B2 | 11/2002 | Adams |
| 6,501,195 B1 | 12/2002 | Barton |
| 6,503,056 B2 | 1/2003 | Eccles et al. |
| 6,504,281 B1 | 1/2003 | Smith et al. |
| 6,512,305 B1 | 1/2003 | Pinkerton et al. |
| 6,518,680 B2 | 2/2003 | McDavid |
| 6,526,757 B2 | 3/2003 | MacKay |
| 6,528,902 B1 | 3/2003 | Barton |
| 6,531,799 B1 | 3/2003 | Miller |
| 6,531,848 B1 | 3/2003 | Chitsazan et al. |
| 6,538,358 B1 | 3/2003 | Krefta et al. |
| 6,541,887 B2 | 4/2003 | Kawamura |
| 6,545,373 B1 | 4/2003 | Andres et al. |
| 6,546,769 B2 | 4/2003 | Miller et al. |
| 6,548,925 B2 | 4/2003 | Noble et al. |
| 6,563,717 B2 | 5/2003 | Lunding et al. |
| 6,565,243 B1 | 5/2003 | Cheung |
| 6,566,764 B2 | 5/2003 | Rebsdorf et al. |
| 6,579,137 B2 | 6/2003 | Mabru |
| 6,590,298 B1 | 7/2003 | Du |
| 6,606,864 B2 | 8/2003 | MacKay |
| 6,622,487 B2 | 9/2003 | Jones |
| 6,631,080 B2 | 10/2003 | Trimble et al. |
| 6,634,176 B2 | 10/2003 | Rouse et al. |
| 6,644,027 B1 | 11/2003 | Kelly |
| 6,647,716 B2 | 11/2003 | Boyd |
| 6,655,341 B2 | 12/2003 | Westerbeke |
| 6,657,348 B2 | 12/2003 | Qin et al. |
| 6,664,688 B2 | 12/2003 | Naito et al. |
| 6,666,027 B1 | 12/2003 | Cardenas |
| 6,669,416 B2 | 12/2003 | Klement |
| 6,672,413 B2 | 1/2004 | Moore et al. |
| 6,675,583 B2 | 1/2004 | Willis et al. |
| 6,677,685 B2 | 1/2004 | Pfleger et al. |
| 6,679,977 B2 | 1/2004 | Haag et al. |
| 6,684,642 B2 | 2/2004 | Willis et al. |
| 6,700,217 B1 | 3/2004 | North et al. |
| 6,700,248 B2 | 3/2004 | Long |
| 6,702,404 B2 | 3/2004 | Anwar et al. |
| 6,703,719 B1 | 3/2004 | McConnell |
| 6,703,747 B2 | 3/2004 | Kawamura |
| 6,707,272 B1 | 3/2004 | Thandiwe |
| 6,710,469 B2 | 3/2004 | McDavid |
| 6,710,491 B2 | 3/2004 | Wu et al. |
| 6,710,492 B2 | 3/2004 | Minagawa |
| 6,710,502 B2 | 3/2004 | Maslov et al. |
| 6,713,936 B2 | 3/2004 | Lee |
| 6,717,313 B1 | 4/2004 | Bae |
| 6,720,688 B1 | 4/2004 | Schiller |
| 6,724,115 B2 | 4/2004 | Kusase |
| 6,727,632 B2 | 4/2004 | Kusase |
| 6,731,019 B2 | 5/2004 | Burns et al. |
| 6,732,531 B2 | 5/2004 | Dickey |
| 6,735,953 B1 | 5/2004 | Wolfe et al. |
| 6,737,829 B2 | 5/2004 | Sastry |
| 6,741,010 B2 | 5/2004 | Wilkin |
| 6,756,719 B1 | 6/2004 | Chiu |
| 6,759,775 B2 | 7/2004 | Grimm |
| 6,765,307 B2 | 7/2004 | Gerber et al. |
| 6,766,647 B2 | 7/2004 | Hartzheim |
| 6,771,000 B2 | 8/2004 | Kim et al. |
| 6,803,696 B2 | 10/2004 | Chen |
| 6,853,107 B2 | 2/2005 | Pyntikov et al. |
| 6,894,411 B2 | 5/2005 | Schmid et al. |
| 6,894,455 B2 | 5/2005 | Cai et al. |
| 6,897,595 B1 | 5/2005 | Chiarenza |
| 6,901,212 B2 | 5/2005 | Masino |
| 6,956,313 B2 | 10/2005 | El-Gabry et al. |
| 6,969,927 B1 | 11/2005 | Lee |
| 7,002,259 B2 | 2/2006 | Howes et al. |
| 7,081,696 B2 | 7/2006 | Ritchey |
| 7,102,248 B2 | 9/2006 | Wobben |
| 7,119,513 B2 | 10/2006 | Ishikawa |
| 7,126,312 B2 | 10/2006 | Moore |
| 7,176,654 B2 | 2/2007 | Meyer et al. |
| 7,193,391 B2 | 3/2007 | Moore |
| 7,239,098 B2 | 7/2007 | Masino |
| 7,248,006 B2 | 7/2007 | Bailey et al. |
| 7,250,702 B2 | 7/2007 | Abou et al. |
| 7,348,764 B2 | 3/2008 | Stewart et al. |
| 7,382,103 B2 | 6/2008 | Shirazee et al. |
| 7,391,180 B2 | 6/2008 | Armiroli et al. |
| 7,400,077 B2 | 7/2008 | Caroon |
| 7,405,490 B2 | 7/2008 | Moehlenkamp |
| 7,427,849 B2 | 9/2008 | Kaneko et al. |
| 7,482,708 B1 | 1/2009 | Barton et al. |
| 7,514,834 B2 | 4/2009 | Takeuchi |
| 7,525,285 B2 | 4/2009 | Plett |
| 7,545,052 B2 | 6/2009 | Llorente et al. |
| 7,554,303 B1 | 6/2009 | Kawamura |
| 7,595,574 B2 | 9/2009 | Ritchey |
| 7,602,158 B1 | 10/2009 | Iacob |
| 7,649,274 B2 | 1/2010 | Burt |
| 7,710,081 B2 | 5/2010 | Saban et al. |
| 7,816,805 B2 | 10/2010 | Tanaka et al. |
| 7,948,141 B2 | 5/2011 | Takeuchi |
| 8,097,970 B2 | 1/2012 | Hyvaerinen |
| 8,106,563 B2 | 1/2012 | Ritchey |
| 8,120,321 B2 | 2/2012 | Vezzini et al. |
| 8,138,620 B2 | 3/2012 | Wagoner et al. |
| 8,212,371 B2 | 7/2012 | Maibach et al. |
| 8,212,445 B2 | 7/2012 | Ritchey |
| 8,247,105 B2 | 8/2012 | Liu |
| 8,278,858 B2 | 10/2012 | Fang et al. |
| 8,288,992 B2 | 10/2012 | Kramer et al. |
| 8,310,198 B2 | 11/2012 | Kurimoto et al. |
| 8,330,419 B2 | 12/2012 | Kim et al. |
| 8,368,357 B2 | 2/2013 | Ghantous et al. |
| 8,426,063 B2 | 4/2013 | Lin |
| 8,427,105 B2 | 4/2013 | Plett |
| 8,427,106 B2 | 4/2013 | Kim et al. |
| 8,427,112 B2 | 4/2013 | Ghantous et al. |
| 8,466,595 B2 | 6/2013 | Spooner |
| 8,470,464 B2 | 6/2013 | Troutman |
| 8,513,921 B2 | 8/2013 | Berkowitz et al. |
| 8,564,247 B2 | 10/2013 | Hintz et al. |
| 8,577,529 B2 | 11/2013 | Takahashi et al. |
| 8,610,383 B2 | 12/2013 | De Sousa et al. |
| 8,614,529 B2 | 12/2013 | Ritchey |
| 8,614,563 B2 | 12/2013 | Baughman |
| 8,685,563 B1 | 4/2014 | Lin |
| 8,729,861 B2 | 5/2014 | Nishida et al. |
| 8,796,993 B2 | 8/2014 | White et al. |
| 8,798,832 B2 | 8/2014 | Kawahara et al. |
| 8,823,296 B2 | 9/2014 | De Sousa et al. |
| 8,917,155 B2 | 12/2014 | Adachi et al. |
| 8,928,282 B2 | 1/2015 | Kudo et al. |
| 8,988,045 B2 | 3/2015 | Klein et al. |
| 9,018,898 B2 | 4/2015 | Ziv et al. |
| 9,024,586 B2 | 5/2015 | Vance et al. |
| 9,054,533 B2 | 6/2015 | Gaul et al. |
| 9,093,864 B2 | 7/2015 | Abe et al. |
| 9,121,910 B2 | 9/2015 | Maluf et al. |
| 9,130,377 B2 | 9/2015 | Barsukov et al. |
| 9,147,910 B2 | 9/2015 | Chuah et al. |
| 9,153,845 B2 | 10/2015 | Tanaka et al. |
| 9,153,996 B2 | 10/2015 | De Sousa et al. |
| 9,197,081 B2 | 11/2015 | Finberg et al. |
| 9,230,730 B2 | 1/2016 | Heins |
| 9,365,120 B2 | 6/2016 | Timmons et al. |
| 9,379,552 B2 | 6/2016 | Ritchey et al. |
| 9,395,420 B2 | 7/2016 | White et al. |
| 9,450,274 B2 | 9/2016 | Vo et al. |
| 9,496,727 B2 | 11/2016 | Liu et al. |
| 9,520,613 B2 | 12/2016 | Brockerhoff |
| 9,564,763 B2 | 2/2017 | Finberg et al. |
| 9,579,961 B2 | 2/2017 | Harris |
| 9,669,726 B2 | 6/2017 | Luo et al. |
| 9,705,340 B2 | 7/2017 | Lucea |
| 9,787,107 B2 | 10/2017 | Lutze et al. |

(56) References Cited

U.S. PATENT DOCUMENTS

| | | |
|---|---|---|
| 9,812,981 B2 | 11/2017 | Ritchey et al. |
| 9,873,342 B2 | 1/2018 | De Sousa et al. |
| 9,885,757 B2 | 2/2018 | Liu et al. |
| 9,902,277 B2 | 2/2018 | Keller et al. |
| 9,948,116 B2 | 4/2018 | Matsumoto et al. |
| 9,960,611 B2 | 5/2018 | Toya |
| 9,979,211 B2 | 5/2018 | Barsukov et al. |
| 10,044,069 B2 | 8/2018 | Despesse |
| 10,069,313 B2 | 9/2018 | Tkachenko et al. |
| 10,073,128 B2 | 9/2018 | Yoshioka et al. |
| 10,074,997 B2 | 9/2018 | Vo et al. |
| 10,093,191 B2 | 10/2018 | Keller et al. |
| 10,103,591 B2 | 10/2018 | Heins |
| 10,147,983 B2 | 12/2018 | Kawahara et al. |
| 10,222,428 B2 | 3/2019 | Saint-Marcoux et al. |
| 10,232,716 B2 | 3/2019 | Higuchi et al. |
| 10,256,643 B2 | 4/2019 | Toya |
| 10,263,435 B2 | 4/2019 | Kim et al. |
| 10,270,263 B2 | 4/2019 | Brozek |
| 10,277,041 B2 | 4/2019 | Zane et al. |
| 10,291,162 B1 | 5/2019 | Heins |
| 10,298,026 B2 | 5/2019 | Trimboli et al. |
| 10,305,298 B2 | 5/2019 | Kristensen |
| 10,305,409 B2 | 5/2019 | Wang et al. |
| 10,330,732 B2 | 6/2019 | Roumi et al. |
| 10,416,236 B2 | 9/2019 | Uchino et al. |
| 10,483,791 B2 | 11/2019 | Mergener et al. |
| 10,483,899 B2 | 11/2019 | Hustedt |
| 10,543,303 B2 | 1/2020 | Zilbershlag et al. |
| 10,561,775 B2 | 2/2020 | Zilbershlag |
| 10,615,610 B1 | 4/2020 | Jelinek |
| 10,644,537 B2 | 5/2020 | Krishnan et al. |
| 10,778,014 B2 | 9/2020 | Barsukov et al. |
| 10,833,512 B2 | 11/2020 | Remboski et al. |
| 10,910,846 B2 | 2/2021 | Jelinek |
| 10,958,075 B2 | 3/2021 | Collins et al. |
| 10,958,083 B2 | 3/2021 | Halsey |
| 10,985,552 B2 | 4/2021 | Tada et al. |
| 10,985,587 B2 | 4/2021 | Matsumura et al. |
| 10,992,144 B2 | 4/2021 | Li et al. |
| 10,992,145 B2 | 4/2021 | Wang et al. |
| 10,992,146 B2 | 4/2021 | Flowers et al. |
| 11,005,276 B2 | 5/2021 | Lee et al. |
| 11,095,148 B2 | 8/2021 | Mergener et al. |
| 11,128,153 B1 | 9/2021 | Cho et al. |
| 11,133,680 B2 | 9/2021 | Wang et al. |
| 11,171,494 B2 | 11/2021 | Tang et al. |
| 11,277,012 B2 | 3/2022 | Ono et al. |
| 11,336,104 B2 | 5/2022 | Poland et al. |
| 11,777,329 B2 | 10/2023 | Osswald et al. |
| 2002/0012261 A1 | 1/2002 | Moindron |
| 2002/0047418 A1 | 4/2002 | Seguchi et al. |
| 2002/0057030 A1 | 5/2002 | Fogarty |
| 2002/0070707 A1 | 6/2002 | Sato |
| 2003/0047209 A1 | 3/2003 | Yanai et al. |
| 2004/0021437 A1 | 2/2004 | Maslov et al. |
| 2004/0037221 A1 | 2/2004 | Aisa |
| 2004/0174652 A1 | 9/2004 | Lewis |
| 2004/0232796 A1 | 11/2004 | Weissensteiner |
| 2004/0251761 A1 | 12/2004 | Hirzel |
| 2005/0013085 A1 | 1/2005 | Kinsella et al. |
| 2005/0024015 A1 | 2/2005 | Houldsworth et al. |
| 2005/0052155 A1 | 3/2005 | Surig |
| 2005/0099314 A1 | 5/2005 | Aisa |
| 2005/0156574 A1 | 7/2005 | Sato et al. |
| 2005/0184689 A1 | 8/2005 | Maslov et al. |
| 2005/0212487 A1 | 9/2005 | Sodeno |
| 2005/0248440 A1 | 11/2005 | Stevens |
| 2005/0269989 A1 | 12/2005 | Geren et al. |
| 2005/0280264 A1 | 12/2005 | Nagy |
| 2006/0022639 A1 | 2/2006 | Moore |
| 2006/0022676 A1 | 2/2006 | Uesaka et al. |
| 2006/0033475 A1 | 2/2006 | Moore |
| 2006/0055377 A1 | 3/2006 | Okubo et al. |
| 2006/0056127 A1 | 3/2006 | Lewis |
| 2006/0092583 A1 | 5/2006 | Alahmad et al. |
| 2006/0097698 A1 | 5/2006 | Plett |
| 2006/0232069 A1 | 10/2006 | Lim et al. |
| 2006/0273766 A1 | 12/2006 | Kawamura |
| 2007/0008669 A1 | 1/2007 | Al-Haddad |
| 2007/0073445 A1 | 3/2007 | Llorente et al. |
| 2007/0182273 A1 | 8/2007 | Burt |
| 2007/0210733 A1 | 9/2007 | Du et al. |
| 2007/0276547 A1 | 11/2007 | Miller |
| 2008/0012538 A1 | 1/2008 | Stewart et al. |
| 2008/0088200 A1 | 4/2008 | Ritchey |
| 2008/0106100 A1 | 5/2008 | Hyvarinen |
| 2008/0116759 A1 | 5/2008 | Lin |
| 2008/0116847 A1 | 5/2008 | Loke et al. |
| 2008/0266742 A1 | 10/2008 | Henke et al. |
| 2009/0027006 A1 | 1/2009 | Vezzini et al. |
| 2009/0066291 A1 | 3/2009 | Tien et al. |
| 2009/0078481 A1 | 3/2009 | Harris |
| 2009/0079397 A1 | 3/2009 | Ibrahim |
| 2009/0167247 A1 | 7/2009 | Bai et al. |
| 2009/0208837 A1 | 8/2009 | Lin |
| 2009/0251100 A1 | 10/2009 | Incledon et al. |
| 2009/0267414 A1 | 10/2009 | Kiyohara et al. |
| 2010/0019593 A1 | 1/2010 | Ritchey |
| 2010/0073970 A1 | 3/2010 | Abolhassani et al. |
| 2010/0090553 A1 | 4/2010 | Ritchey |
| 2010/0207580 A1 | 8/2010 | Nishida et al. |
| 2010/0244781 A1 | 9/2010 | Kramer et al. |
| 2010/0244847 A1 | 9/2010 | Kudo et al. |
| 2010/0259219 A1 | 10/2010 | Yokomizo et al. |
| 2010/0261043 A1 | 10/2010 | Kim et al. |
| 2010/0261048 A1 | 10/2010 | Kim et al. |
| 2010/0305792 A1 | 12/2010 | Wilk et al. |
| 2011/0057617 A1 | 3/2011 | Finberg et al. |
| 2011/0078470 A1 | 3/2011 | Wang et al. |
| 2011/0089897 A1 | 4/2011 | Zhang et al. |
| 2011/0127960 A1 | 6/2011 | Plett |
| 2011/0169454 A1 | 7/2011 | Maruyama et al. |
| 2011/0241630 A1 | 10/2011 | Ritchey et al. |
| 2011/0260687 A1 | 10/2011 | Kudo et al. |
| 2011/0266806 A1 | 11/2011 | Numajiri |
| 2012/0013304 A1 | 1/2012 | Murase et al. |
| 2012/0065824 A1 | 3/2012 | Takahashi et al. |
| 2012/0074898 A1 | 3/2012 | Schwartz |
| 2012/0091964 A1 | 4/2012 | Vance et al. |
| 2012/0094150 A1 | 4/2012 | Troutman |
| 2012/0112688 A1 | 5/2012 | Ho |
| 2012/0194403 A1 | 8/2012 | Cordier et al. |
| 2012/0206105 A1 | 8/2012 | Nishizawa et al. |
| 2012/0229060 A1 | 9/2012 | Ritchey et al. |
| 2012/0239214 A1 | 9/2012 | Nakashima et al. |
| 2012/0256592 A1 | 10/2012 | Baughman |
| 2012/0274331 A1 | 11/2012 | Liu et al. |
| 2012/0319493 A1 | 12/2012 | Kim et al. |
| 2013/0002182 A1 | 1/2013 | Bates et al. |
| 2013/0002183 A1 | 1/2013 | Bates et al. |
| 2013/0002201 A1 | 1/2013 | Bodkin et al. |
| 2013/0009595 A1 | 1/2013 | Brown |
| 2013/0020979 A1 | 1/2013 | Bates et al. |
| 2013/0026989 A1 | 1/2013 | Gibbs et al. |
| 2013/0026993 A1 | 1/2013 | Hintz et al. |
| 2013/0033231 A1 | 2/2013 | Zhang |
| 2013/0065093 A1 | 3/2013 | White et al. |
| 2013/0069598 A1 | 3/2013 | Tanaka et al. |
| 2013/0169234 A1 | 7/2013 | Chuah et al. |
| 2013/0175954 A1 | 7/2013 | Astigarraga et al. |
| 2013/0175966 A1 | 7/2013 | Astigarraga et al. |
| 2013/0207599 A1 | 8/2013 | Ziv et al. |
| 2013/0257382 A1 | 10/2013 | Field et al. |
| 2014/0015488 A1 | 1/2014 | Despesse |
| 2014/0021924 A1 | 1/2014 | Abe et al. |
| 2014/0077752 A1 | 3/2014 | Barsukov et al. |
| 2014/0103850 A1 | 4/2014 | Frank |
| 2014/0145684 A1 | 5/2014 | Liu et al. |
| 2014/0167708 A1 | 6/2014 | Ritchey |
| 2014/0167780 A1 | 6/2014 | White et al. |
| 2014/0252922 A1 | 9/2014 | Ritchey et al. |
| 2014/0253271 A1 | 9/2014 | Heins |
| 2014/0287278 A1 | 9/2014 | Despesse |

(56) References Cited

U.S. PATENT DOCUMENTS

| | | |
|---|---|---|
| 2014/0292283 A1 | 10/2014 | Timmons et al. |
| 2014/0312828 A1 | 10/2014 | Vo et al. |
| 2014/0327407 A1 | 11/2014 | Lucea |
| 2014/0347903 A1 | 11/2014 | Ritchey et al. |
| 2014/0361743 A1 | 12/2014 | Lin et al. |
| 2014/0363881 A1 | 12/2014 | Caiafa et al. |
| 2014/0368168 A1 | 12/2014 | Beckman |
| 2015/0028817 A1 | 1/2015 | Brockerhoff |
| 2015/0102779 A1 | 4/2015 | Schumacher et al. |
| 2015/0219721 A1 | 8/2015 | Yang et al. |
| 2015/0231985 A1 | 8/2015 | Li |
| 2015/0244313 A1 | 8/2015 | McNamara et al. |
| 2015/0280466 A1 | 10/2015 | Owen et al. |
| 2015/0380959 A1 | 12/2015 | Chang et al. |
| 2016/0043579 A1 | 2/2016 | Finberg et al. |
| 2016/0072316 A1 | 3/2016 | Barsukov et al. |
| 2016/0089994 A1 | 3/2016 | Keller et al. |
| 2016/0111900 A1 | 4/2016 | Beaston et al. |
| 2016/0134210 A1 | 5/2016 | Bock et al. |
| 2016/0190830 A1 | 6/2016 | Kuhlmann et al. |
| 2016/0241054 A1 | 8/2016 | Matsumoto et al. |
| 2016/0254683 A1 | 9/2016 | Matsumoto et al. |
| 2016/0336764 A1 | 11/2016 | Becker et al. |
| 2016/0336765 A1 | 11/2016 | Trimboli et al. |
| 2016/0336767 A1 | 11/2016 | Zane et al. |
| 2016/0351976 A1 | 12/2016 | Kawahara et al. |
| 2017/0016961 A1 | 1/2017 | Lucea |
| 2017/0054306 A1 | 2/2017 | Vo et al. |
| 2017/0104347 A1 | 4/2017 | Shimonishi et al. |
| 2017/0146609 A1 | 5/2017 | Uchino et al. |
| 2017/0214253 A1 | 7/2017 | Kim et al. |
| 2017/0264110 A1 | 9/2017 | Toya |
| 2017/0271893 A1 | 9/2017 | Brozek |
| 2017/0299660 A1 | 10/2017 | Saint-Marcoux et al. |
| 2017/0346334 A1 | 11/2017 | Mergener et al. |
| 2018/0008760 A1 | 1/2018 | Zilbershlag et al. |
| 2018/0019694 A1 | 1/2018 | Spickard |
| 2018/0056798 A1 | 3/2018 | Syouda |
| 2018/0062402 A1 | 3/2018 | Syouda |
| 2018/0123357 A1 | 5/2018 | Beaston et al. |
| 2018/0134168 A1 | 5/2018 | Keller et al. |
| 2018/0145520 A1 | 5/2018 | Sasaki et al. |
| 2018/0219390 A1 | 8/2018 | Tkachenko et al. |
| 2018/0226810 A1 | 8/2018 | Barsukov et al. |
| 2018/0241227 A1 | 8/2018 | Halsey |
| 2018/0278146 A1 | 9/2018 | Guven et al. |
| 2018/0301929 A1 | 10/2018 | Krishnan et al. |
| 2018/0337536 A1 | 11/2018 | Li et al. |
| 2018/0339093 A1 | 11/2018 | Zilbershlag |
| 2018/0366959 A1 | 12/2018 | Coenen |
| 2019/0103750 A1 | 4/2019 | Kristensen |
| 2019/0115849 A1 | 4/2019 | Götz |
| 2019/0148952 A1 | 5/2019 | Remboski et al. |
| 2019/0229540 A1 | 7/2019 | Lee et al. |
| 2019/0273380 A1 | 9/2019 | Collins et al. |
| 2019/0280488 A1 | 9/2019 | Tang et al. |
| 2019/0288526 A1 | 9/2019 | Jaensch et al. |
| 2019/0299799 A1 | 10/2019 | Hinterberger et al. |
| 2019/0334354 A1 | 10/2019 | Mizukami et al. |
| 2019/0393696 A1 | 12/2019 | Tada et al. |
| 2020/0036047 A1 | 1/2020 | Aikens et al. |
| 2020/0044459 A1 | 2/2020 | Lee et al. |
| 2020/0052524 A1 | 2/2020 | Mergener et al. |
| 2020/0099110 A1 | 3/2020 | Lin |
| 2020/0122580 A1 | 4/2020 | Zou et al. |
| 2020/0144952 A1 | 5/2020 | Mao et al. |
| 2020/0203961 A1 | 6/2020 | Flowers et al. |
| 2020/0220364 A1 | 7/2020 | Wang et al. |
| 2020/0244076 A1 | 7/2020 | Wang et al. |
| 2020/0274203 A1 | 8/2020 | Kirleis et al. |
| 2020/0274368 A1 | 8/2020 | Crouse |
| 2020/0274371 A1 | 8/2020 | Kirleis et al. |
| 2020/0274386 A1 | 8/2020 | Kirleis et al. |
| 2020/0321788 A1 | 10/2020 | Ono et al. |
| 2020/0373801 A1* | 11/2020 | Kinjo ............ H02K 11/33 |
| 2020/0381925 A1 | 12/2020 | Jelinek |
| 2020/0403420 A1 | 12/2020 | Nagase et al. |
| 2020/0412159 A1 | 12/2020 | Snyder et al. |
| 2021/0013784 A1 | 1/2021 | Shirazee |
| 2021/0044119 A1 | 2/2021 | Poland et al. |
| 2021/0075230 A1 | 3/2021 | Ono et al. |
| 2021/0083506 A1 | 3/2021 | Rao et al. |
| 2021/0098996 A1 | 4/2021 | Ono et al. |
| 2021/0098998 A1 | 4/2021 | Eo |
| 2021/0135489 A1 | 5/2021 | Stites-Clayton et al. |
| 2021/0234380 A1 | 7/2021 | Ono et al. |
| 2021/0249873 A1 | 8/2021 | Despesse et al. |
| 2021/0257947 A1* | 8/2021 | Kinjo ............ H02P 25/22 |
| 2021/0273461 A1 | 9/2021 | Lin et al. |
| 2021/0296912 A1 | 9/2021 | Cho et al. |
| 2021/0302505 A1 | 9/2021 | Worry et al. |
| 2021/0313830 A1 | 10/2021 | Dowler et al. |
| 2022/0060029 A1 | 2/2022 | Syouda et al. |
| 2022/0216728 A1 | 7/2022 | Ashman et al. |
| 2022/0407334 A1 | 12/2022 | Kouda et al. |

FOREIGN PATENT DOCUMENTS

| | | |
|---|---|---|
| CA | 1038918 A | 9/1978 |
| CA | 2341095 A1 | 10/2001 |
| CA | 2459126 A1 | 4/2003 |
| CA | 2543354 C | 12/2014 |
| CN | 1082740 C | 4/2002 |
| CN | 101582672 A | 11/2009 |
| CN | 102148111 A | 8/2011 |
| CN | 102484448 A | 5/2012 |
| CN | 202841012 U | 3/2013 |
| CN | 107683554 A | 2/2018 |
| DE | 19733208 C1 | 10/1998 |
| DE | 102006033629 A1 | 1/2008 |
| EP | 0613234 B1 | 11/2001 |
| EP | 1416604 A2 | 5/2004 |
| EP | 1413046 B1 | 5/2006 |
| EP | 1717946 A2 | 11/2006 |
| EP | 1068663 B1 | 5/2008 |
| EP | 1680861 B1 | 1/2009 |
| EP | 2797221 A1 | 10/2014 |
| EP | 3360795 A1 | 8/2018 |
| JP | 2001161098 A | 6/2001 |
| JP | 2001204198 A | 7/2001 |
| JP | 3481037 B2 | 12/2003 |
| JP | 2004336836 A | 11/2004 |
| JP | 2006521781 A | 9/2006 |
| JP | 2007097341 A | 4/2007 |
| JP | 2009080093 A | 4/2009 |
| JP | 4790618 B2 | 7/2011 |
| JP | 2013247003 A | 12/2013 |
| JP | 5798015 B2 | 8/2015 |
| KR | 1020070082819 | 8/2007 |
| KR | 102066323 B1 | 1/2020 |
| SE | 9701662 | 6/1998 |
| WO | 8100651 A1 | 3/1981 |
| WO | 8807782 A1 | 10/1988 |
| WO | 9708009 A1 | 3/1997 |
| WO | 9808291 A1 | 2/1998 |
| WO | 9848290 A1 | 10/1998 |
| WO | 2004001949 A1 | 12/2003 |
| WO | 2004004109 A2 | 1/2004 |
| WO | 2004088832 A1 | 10/2004 |
| WO | 2005043740 A2 | 5/2005 |
| WO | 2007098227 A2 | 8/2007 |
| WO | 2008067649 A2 | 6/2008 |
| WO | 2008091035 A1 | 7/2008 |
| WO | 2008119864 A1 | 10/2008 |
| WO | 2010057892 A1 | 5/2010 |
| WO | 2010057893 A1 | 5/2010 |
| WO | 2013155601 A1 | 10/2013 |
| WO | 2017219136 A1 | 12/2017 |
| WO | 2018213919 A1 | 11/2018 |
| WO | 2020047663 A1 | 3/2020 |

(56) References Cited

FOREIGN PATENT DOCUMENTS

| WO | 2021001046 A1 | 1/2021 |
|---|---|---|
| WO | 2021094744 A1 | 5/2021 |

OTHER PUBLICATIONS

Non Final Office Action for U.S. Appl. No. 17/842,217, dated Aug. 8, 2022, 25 pages.
International Search Report and Written Opinion dated Aug. 15, 2022 in PCT/CA2022/050753.
International Search Report and Written Opinion dated Sep. 21, 2022 in PCT/CA2022/050620, 17 pages.
Non Final Office Action for U.S. Appl. No. 17/727,143, dated Aug. 22, 2022, 28 pages.
"New Motor architecture could be a game-changer", High Power Media Ltd., E-Mobility Engineering, 2021, 6 pages.
"Single Wound and Dual Winding Motor", Yaskawa America, Models & Ratings, 220v Motor/400V Motor, Standard 200V Series.
"What is Dynamic Torque Switching?", Info@epropelled.com, 4 pages.
Anders, "Analysis of a gas turbine driven hybrid drive system for heavy vehicles", Thesis/Dissertation, ETDEWEB, U.S. Department of Energy Office of Scientific and Technical Information, Jul. 1, 1999, 4 pages.
Canadian Examination Report, dated Mar. 3, 2017, for CA 2,773,102, 4 pages.
Canadian Examination Report, dated Nov. 1, 2017, for CA 2,773,040, 4 pages.
Canadian Office Action, for Canadian Application No. 2,487,668, dated Oct. 6, 2011, 4 pages.
Canadian Office Action, for Canadian Application No. 3,061,619, dated Sep. 2, 2021, 4 pages.
Chinese Office Action dated Jan. 29, 2022 for Chinese Application No. 2018800337539, 8 pages (English translation of action).
Eckart Nipp, "Alternative to Field-Weakening of Surface-Mounted Permanent-magnet Motors for Variable-Speed Drives", IEEE Xplore 1995, 8 pages.
Eckart Nipp, "Permanent Magnet Motor Drives with Switched Stator Windings", Kungl Tekniska Hogskolan, TRITA-EMD-9905 ISSN-1102-0172, Submitted to the School of Electric Engineering and Information Technology, 1999, 315 pages.
European Examination Report, dated Apr. 18, 2017, for EP 10 814 529.3, 6 pages.
Extended European Search Report, dated Oct. 14, 2020, for EP 18806122, 7 pages.
First Office Action and Search Report (with English Translation) from corresponding CN application No. 201080039251.0, dated Jan. 30, 2014, 16 pages.
Huang, et al., "Electrical Two-Speed Propulsion by Motor Winding Switching and Its Control Strategies for Electric Vehicles" IEEE transactions on Vehicular Technology, vol. 48, No. 2, Mar. 1999, 12 pages.
International Preliminary Report on Patentability and Written Opinion, dated Mar. 6, 2012, for PCT/US2010/047750, 5 pages.
International Preliminary Report on Patentability with Written Opinion dated Nov. 26, 2019, for International Application No. PCT/CA2018/050222, filed Feb. 27, 2018, 6 pages.
International Search Report and Written Opinion, dated Jun. 2, 2020, for PCT/CA2020/050534, 10 pages.
International Search Report and Written Opinion, dated May 24, 2011, for PCT/US2010/047750, 7 pages.
International Search Report and Written Opinion, dated May 8, 2018, for PCT/CA2018/050222, 7 pages.
International Search Report and Written Opinion, dated Nov. 13, 2019, for PCT/CA2019/051239, 9 pages.
International Search Report and Written Opinion, dated Sep. 28, 2007, for PCT/CA2007/001040, 8 pages.
International Search Report for PCT/CA2020/050534, dated Jun. 2, 2020, 4 pages.
Notice of Allowance dated Jun. 15, 2021, for Ritchey, "Variable Coil Configuration System Control, Apparatus and Method," U.S. Appl. No. 16/615,493, 10 pages.
Tang et al., "A Reconfigurable-Winding System For Electric Vehicle Drive Applications", 2017 IEEE Transportation Electrification Conference and Expo (ITEC), 6 pages.
Tang, "Electric Motor Performance Improvement Techniques", 2016 U.S. DOE Vehicle Technologies Office Review, Project ID:EDT071, Oak Ridge National Laboratory, 23 pages.
Written Opinion for PCT/CA2020/050534, dated Jun. 2, 2020, 6 pages.
Villani M., et al., "Fault-tolerant brushless DC drive for aerospace application. In the XIX International Conference on Electrical Machines—ICEM, Sep. 6, 2010", 1-7.
Maslov, et al. "Low-Speed High-Torque Brushless PM Motor for Propulsion Applicatins With an Advanced Magentic Path Design," U.S. Appl. No. 60/399,415, filed Jul. 31, 2002, 18 pages.
Babaei, et a;, "New cascaded multilevel inverter topology with minimum number of switches", Energy Conversion and Management 50 (2009) 2761-2767, 7 pages.
Final Office Action for U.S. Appl. No. 17/727,143, dated Feb. 16, 2023, 26 pages.
Horsche et al., "Realising Serial Hybrid Energy Storage Systems (sHESS) by implementing Switching Circuits on Battery Cell Level", EVS29 Symposium, Montreal Quebec, Canada, Jun. 19-22, 2016.
International Search Report and Written Opinion for PCT/CA2022/000039, dated Nov. 23, 2022, 12 pages.
Non-Final Office Action Issued in U.S. Appl. No. 17/727,143, dated Jun. 9, 2023, 28 pages.
Notice of Allowance for U.S. Appl. No. 17/605,354, dated Mar. 20, 2023, 12 pages.
Notice of Allowance for U.S. Appl. No. 17/727,143, dated Sep. 20, 2023.
Notice of Allowance for U.S. Appl. No. 17/842,217, dated Apr. 12, 2023, 10 pages.
Speltino, et al., "Cell Equalization In Battery Stacks Through State Of Charge Estimation Polling", 2010 American Control Conference Marriott Waterfront, Baltimore, MD, USA Jun. 30-Jul. 2, 2010, 6 pages.
Welsh, "A Comparison of Active and Passive Cell Balancing Techniques for Series/Parallel Battery Packs" Thesis, Electrical and Computer Engineering Graduate Program, The Ohio State University, 2009, 115 pages.
Non-Final Office Action Issued in U.S. Appl. No. 17/274,036, mailed Dec. 21, 2023, 15 pages.
Zhang, et al., "A harmonic injection method for improving NVH performance permanent magnet synchronous motor", Journal of Physics: Conference Series, 1802 (2021) 032132, 6 pages.

\* cited by examiner

US 11,967,913 B2

METHOD AND APPARATUS TO DRIVE COILS OF A MULTIPHASE ELECTRIC MACHINE

CROSS REFERENCE TO RELATED APPLICATIONS

The present application for patent claims the benefit of U.S. Provisional Patent Application No. 63/188,151 filed May 13, 2021, and expressly incorporated by reference herein.

BACKGROUND

Technical Field

The present disclosure generally relates to methods and apparatus to drive coils or windings of multiphase electric machines (e.g., electric motor, an induction motor, generator), and in particular to methods and apparatus employing coil driver modulation techniques.

Description of Related Art

Voltage source inverters (VSI) utilize an energy storage element on a DC link to provide a fixed, low AC impedance, DC voltage to the switching elements. The storage element is generally a capacitor, but can also be other types of storage elements, for example voltage sources, for instance a primary or secondary chemical battery (e.g., a lithium ion battery), or the like. The DC voltage is then applied to a load via switches to generate the desired output voltage via variable ON time, fixed frequency, i.e., duty cycle, or less typically a combination of variable ON time and variable frequency. The switches are generally semiconductor switches (e.g., Metal Oxide Field Effect Transistors (MOSFETs), Insulated Gate Bipolar Transistors (IGBTs)).

Although analog control is possible, most inverters employ a Pulse Width Modulation (PWM) pattern using a microcontroller with specifically designed timer/counter blocks. The main principle of PWM technique is that through ON/OFF control on the switches (e.g., semiconductor switches), a series of pulses with the same amplitude and different width are generated on an output port to replace the sinusoidal wave or other waveforms typically used. The duty cycle of the output waveform needs to be modulated by a certain rule and as a result both the output voltage and output frequency of the inverter can be regulated.

The most common approach is called "center aligned PWM", where all the pulses for the various phases (e.g., three phases) use the same "timer top". Another approach is called "edge aligned PWM" where all of the phases (e.g., three phases) share the leading edge, but turn OFF at different times to generate the desired average voltage per phase.

FIG. 3 illustrates a center aligned 3 phase PWM pattern. The three phases (phase A, phase B, and phase C) are all centered on a timer center. Each of the three phases shares an ON state and an Off state. Each of the phases has a different duty cycle, but each is centered on the timer center as shown. In other words, the pulse center is fixed in the center of a time window and both edges of each pulse moves to compress or expand the width of the corresponding pulse.

Due to an interaction between the three generated line voltages in a conventional three phase inverter there is not a lot of flexibility in varying the way the duty cycles are applied to the output in order to generate the desired voltages.

The energy storage element on the DC link supplies the current, and the switches are operated at the PWM frequency to generate the desired output voltage/current. Generating the desired output voltage/current puts a large ripple current stress on the storage element. A general rule of thumb is that a DC link storage element worst case Root Mean Square (RMS) ripple current exposure is approximately 0.6× the RMS phase current. As an example, a 100 A RMS per phase inverter would generate about 60 A RMS ripple current in the DC link storage element.

SUMMARY

The large RMS current requirement on a DC link storage element drives both cost and size/weight. Therefore reducing the RMS current results in a cost and size/weight reduction for motor drives.

The PWM drive scheme described herein in conjunction with an inverter topology comprising a pair of half bridges (H bridges) and a series switch can advantageously provide a large reduction in RMS ripple current stress on the DC storage element. The described motor drive topology, where there is essentially no PWM or voltage interaction between phases, makes it possible to change the PWM pattern(s) to reduce the ripple current stress on the storage element.

It should be noted that modulator angle refers to an angle of a saw tooth carrier generating the PWM for each H bridge. This saw tooth carrier can be an analog voltage used to compare against the demand by a comparator, or a waveform generated by count up/down timers and counter compare.

Compared to conventional three phase inverters, the disclosed coil driver utilizing the disclosed modulation method has much lower ripple current, peak-to-peak current, and raises the order of the harmonic content. This greatly simplifies capacitor and EMI filter design and reduces their size/weight.

According to one aspect, an apparatus may be summarized as a coil driver for each phase of a multi-phase electric machine that comprises:

a DC energy store coupled between ports of the coil driver;

a first switch pair, the first switch pair having at least two switch elements connected in series between the ports of the coil drive and having a first node between the at least two switch elements;

a second switch pair, the second switch pair having at least two switch elements connected in series between the ports of the coil drive and having a second node between the at least two switch elements, wherein a first AC drive current or AC voltage for a first coil is generated between the first node and the second node;

a third switch pair, the third switch pair having at least two switch elements connected in series between the ports of the coil drive and having a third node between the at least two switch elements;

a fourth switch pair, the fourth switch pair having at least two switch elements connected in series between the ports of the coil drive and having a fourth node between the at least two switch elements, wherein a second AC drive current or AC voltage for a second coil is generated between the third node and the fourth node;

a fifth switch pair, the fifth switch pair having at least two switch elements connected in series between the second node and the third node;

wherein:

in a first mode the first switch pair, the fourth switch pair, and the fifth switch pair are on and the second switch pair and the third switch pair are off, in a second mode the first switch pair, the second switch pair, the third switch pair, and the fourth switch pair are on, and the fifth switch pair is off and in the first mode the first and second AC voltages have a frequency factor that is twice a drive modulation frequency of the switches.

According to one aspect, in the first mode an angle of a modulator carrier varies to drive each phase of a pulse width modulated pattern.

According to one aspect, in the first mode the angle of the modulator carrier varies for each phase by one of +/−120 degrees and +/−60 degrees.

According to one aspect, in the second mode two H bridges drive identical current.

According to one aspect, in the second mode two identical currents are interleaved.

According to one aspect, in the second mode a modulator carrier varies to drive each phase with a carrier angle offset between at least 60° and 120°.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1A:
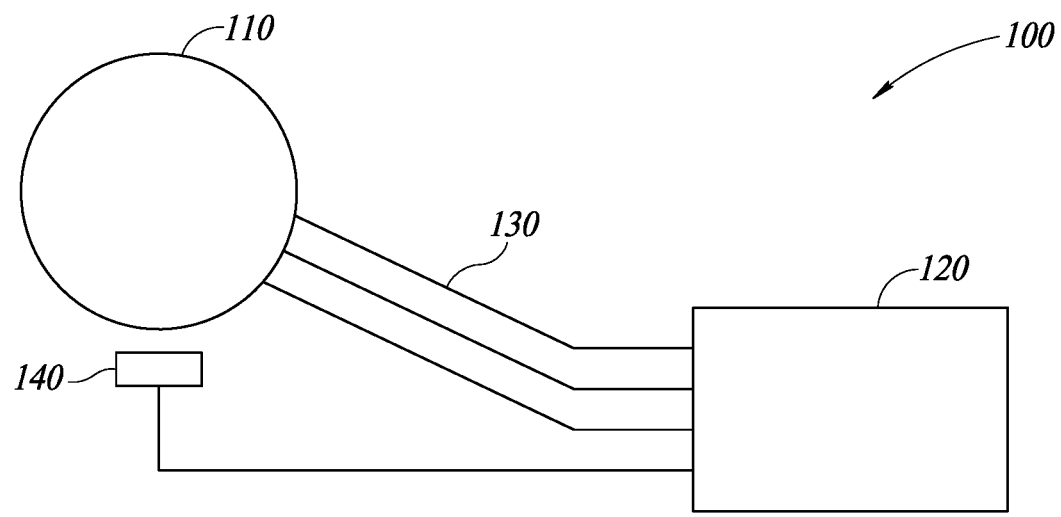
FIG. 1A is a schematic diagram of a system including an electric machine and a controller.

FIG. 1A shows a system 100 including an electric machine 110 (e.g., electric motor, induction motor, generator) and control subsystem 120, according to at least one illustrated implementation.

The electric machine 100 can take the form a multiphase electric machine, for instance a three phase electric motor (e.g., three phase permanent magnet (PM) motor), induction motor, or the like. The electric machine 100 can, for example, include a rotor with a plurality of permanent magnets arrayed thereabout, and a stator with a plurality of coils or windings arrayed thereabout. The rotor is mounted to rotate with respect to the stator, for instance in response to selective excitation of magnetic fields in the coils or windings.

The control system 120 is coupled to control the electric machine by one or more control lines 130, for example via operation of various switches to control the selective excitation of magnetic fields in the coils or windings, as described in detail herein. The control system 120 can include one or more processors (e.g., microprocessors, microcontrollers, digital signal processors (DSPs), graphics processing units (GPUs), field programmable gate arrays (FPGAs), programmable logic units (PLUs), motor controllers, or other control circuits. The control system can include one or more nontransitory storage media, for example memory (e.g., read only memory (ROM), random access memory (RAM), FLASH memory) or other media (e.g., magnetic disk drive, optical disk drive), which stores processor-executable instructions, which when executed by one or more processors cause the one or more processors to execute logic to control operation of the electric machine, for instance as described herein. The control system can include one or more sensors 140 or receive information from one or more sensors 140, for example one or more current sensors, voltage sensors, position or rotary encoders, Hall effect sensors, or Reed switches, which allow the operation of the electric machine and control circuitry to be monitored.

Figure 1B:
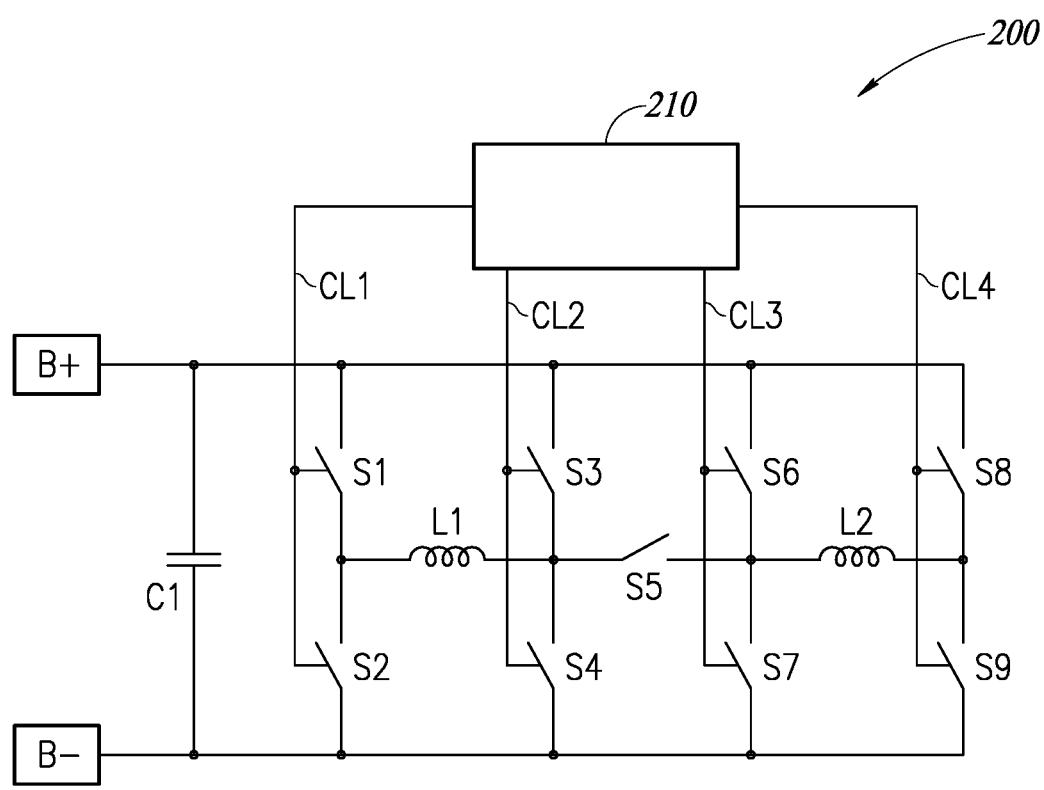
FIG. 1B is a schematic diagram showing a single phase coil driver, according to at least one illustrated implementation.

FIG. 1B is a schematic diagram of a circuit 200 for a single phase of an electric machine (e.g., electric motor), according to at least one illustrated implementation. Each phase of the electric machine has two or more coils or distinct portions or segments of a coil or winding for the phase of the electric machine, denominated in FIG. 1B as L1 and L2. The circuit 200 is sometimes referred to herein and in the claims as a single phase coil driver or simply referred to as a coil driver even though the illustrated circuit 200 includes the coils, windings, or portions or segments of the coils or windings. For a multiphase electric machine (e.g., three phase permanent magnet (PM) motor) there would be a respective circuit 200 for each phase of the multiphase electric machine.

In FIG. 1B L1 and L2 represent motor coils for the single phase and C1 is the DC link energy storage element. Switches S1, S2, S3, S4, S6, S7, S8, and S9 function as PWM switches for the inverter and S5 is a series switch. Typically the switches would be comprised of one or more semiconductor devices, for example silicon or silicon carbide MOSFET, IGBT etc. A controller 210 is coupled to the switches by one or more control lines CL1-CL4 and drives the switches. The controller 210 can be a microcontroller or the like.

The coil driver depicted in FIG. 1B has two operating modes a series mode and a parallel mode. In the series mode, S5 is ON, S3, S4, S6, and S7 are "OFF" and S1, S2, S8, and S9 are in "PWM" mode forming an active "H bridge" driving the series connected coil. In series mode coil pairs from each phase are switched in series and driven by one H bridge per phase. In the parallel mode S5 is "OFF" and S1 to 4 and S6 to S9 are in "PWM" mode, which creates two H bridges driving L1 and L2 as individual coils. In parallel mode the coil pairs are individually driven by their own H bridge, resulting in 2 H bridges per phase.

The coil driver for each phase of a multiphase electric machine shown in FIG. 1B includes a DC energy store C1 coupled between ports B+ and B− of the coil driver and four switch pairs and a series switch. A first switch pair has at least two switch elements S1, S2 connected in series between the ports of the coil drive and having a first node between the at least two switch elements S1, S2. A second switch pair having at least two switch elements S3, S4 connected in series between the ports of the coil drive and having a second node between the at least two switch elements S3, S4. A first AC drive current or AC voltage for a first coil L1 is generated between the first node and the second node. A third switch pair is connected in series between the ports of the coil drive and having a third node between the at least two switch elements S6, S7. A fourth switch pair having at least two switch elements S8, S9 connected in series between the ports of the coil drive and having a fourth node between the at least two switch elements. A second AC drive current or AC voltage for a second coil L2 is generated between the third node and the fourth node. A fifth switch S5 is connected in series between the second node and the third node.

There are two distinct operating modes that provide different opportunity for ripple current reduction. In a series mode coil pairs from each phase are switched in series and driven by one H bridge per phase. In a parallel mode the coil pairs are individually driven by their own H bridge, resulting in 2 H bridges per phase.

Each of the two operating modes are distinct and offer different opportunities for ripple current reduction.

To compare the effect of the presented modulation scheme the following simulations were adjusted such that the operating point for the inverter and coil driver is kept consistent. Since it is well known in the field that modulation depth, current angle, and the like have a large influence on DC link ripple current, the load and operating voltage is adjusted to maintain these the same. It should be noted that this is only done for academic reasons, because in reality series and parallel modes allow a machine to operate over a wider range of speeds and torques resulting in widely varying operating conditions. Specifically, the operating point in series and in parallel, by definition, cannot be the same.

Figure 2:
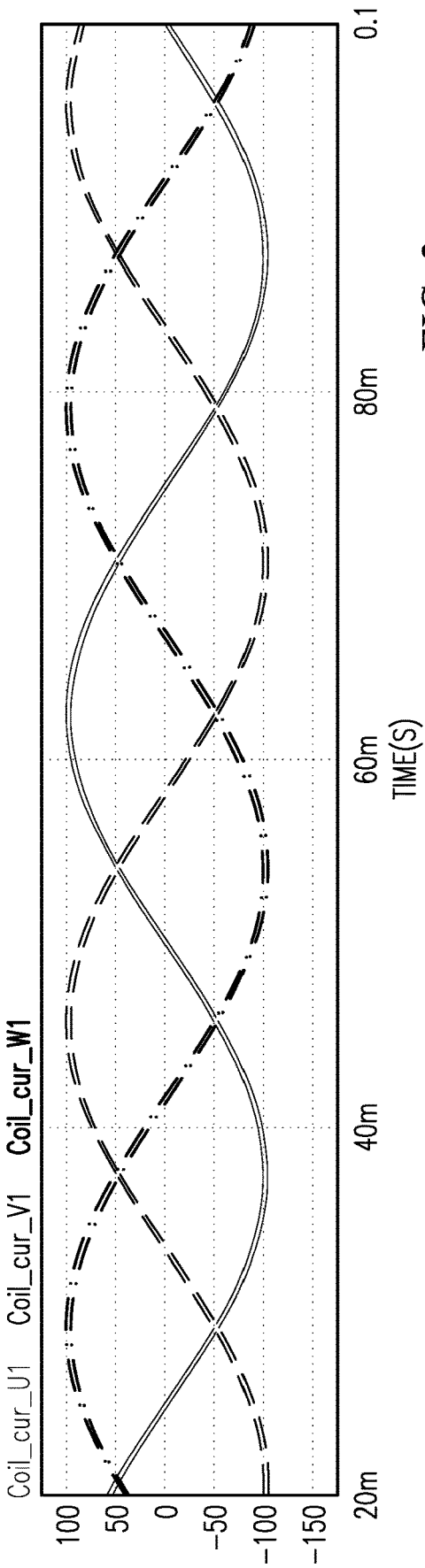
FIG. 2 is a graph showing a respective current for each phase of a 3-phase system.

FIG. 2 shows a current for each phase of a 3-phase system. The currents in FIG. 2 are balanced. A mathematical property of a balanced three phase system is that quantities at any instant, for example all three currents, sum to zero. Put another way, $$Ia+Ib+Ic=0 \qquad (\text{eq. 1}).$$

One aspect of the proposed modulation method utilizes the property of the three phase quantities to adjust the PWM such that a maximum current cancelation occurs.

One aspect of the invention is to reduce capacitor size. One factor that affects capacitor sizing is frequency. Accordingly, the modulation method would drive the current harmonics up in frequency, which has the effect of reducing capacitance requirements and simplifying EMI filter requirements.

Figure 3:
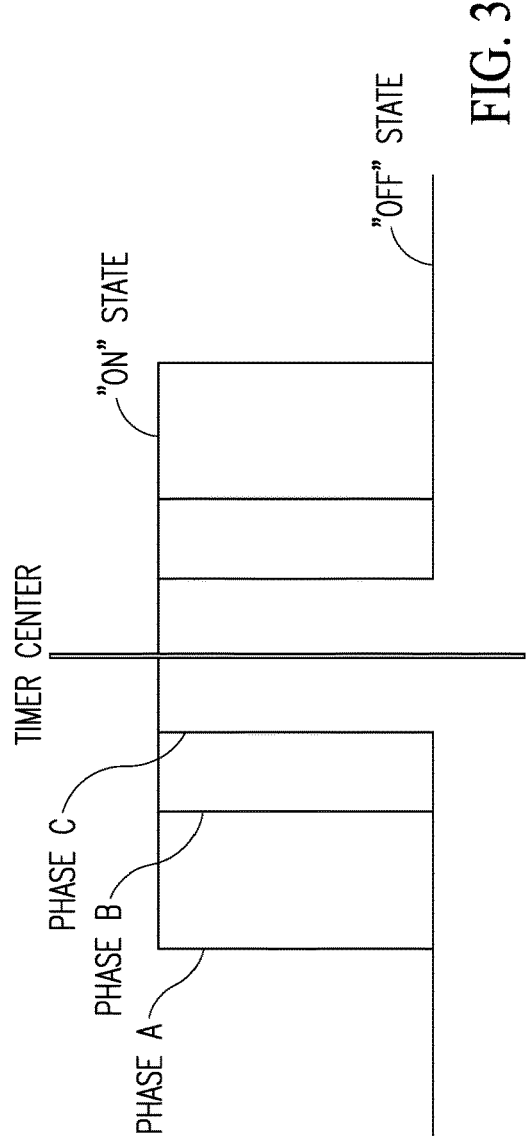
FIG. 3 is a graph illustrating a center aligned PWM approach.
Figure 4:
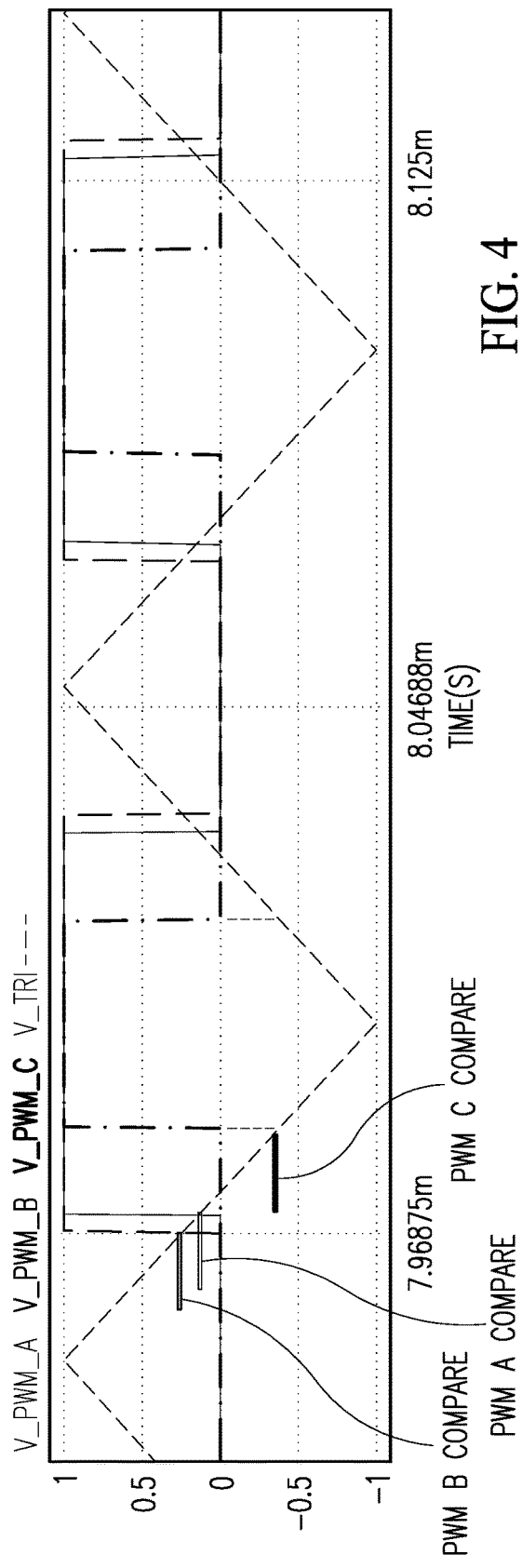
FIG. 4 is a graph illustrating a center aligned 3-phase PWM pattern.

FIGS. 3 and 4 show a center aligned PWM. The center aligned PWM forces all the "ON" times to overlap with each of the phases having a respective duty cycle variation. A baseline condition is a 3-phase inverter delivering the same coil current at the same modulation index, with the same coil impedance. Since the coil driver applies full DC link to the coils, the best comparison is a 3 phase drive with a delta connected load. This way the coil or delta leg currents are the same and the coils each have the same inductance/resistance. Since the coil driver can drive two coils, either in series or parallel, the parallel connected coils in delta for the 3 phase comparison is used to evaluate series mode ripple current. In operation, a series mode would put the two coils in series, resulting in an increase of the inductance and resistance by factor of 4. In the series mode, this also results in AC voltages across the coils having a frequency factor that is twice a drive modulation frequency. All other conditions are the same: DC link voltage and parasitic components (ESR/ESL), induced voltage in the machine, power factor (or current angle i.e., id/iq). The chosen operating point represents only q axis current (i.e., in phase with the induced voltage). It should be noted that the current angle in the coils will be the same, which means due to the nature of a delta connection, the current angle of the phase current will have a 30° angle with respect to coil current.

Figure 5:
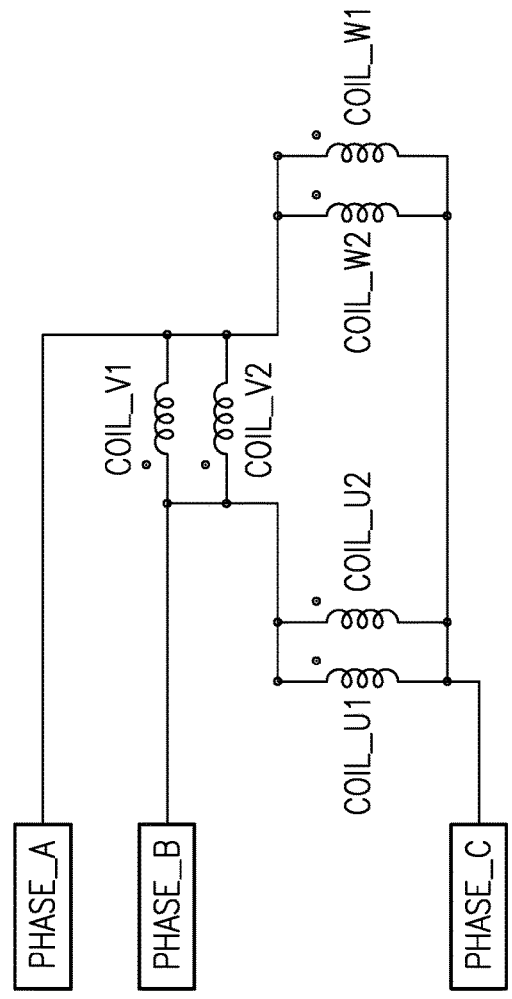
FIG. 5 is a schematic diagram of a delta connection of a 3 phase equivalent load.
Figure 6:
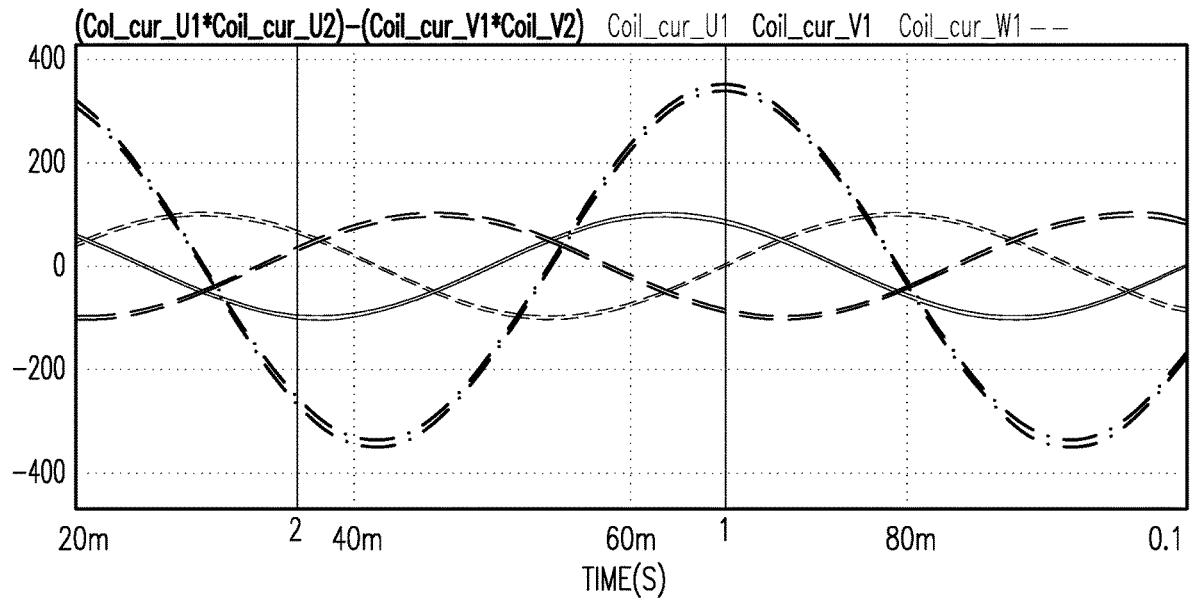
FIG. 6 is a graph illustrating a phase current/coil current.
Figure 7:
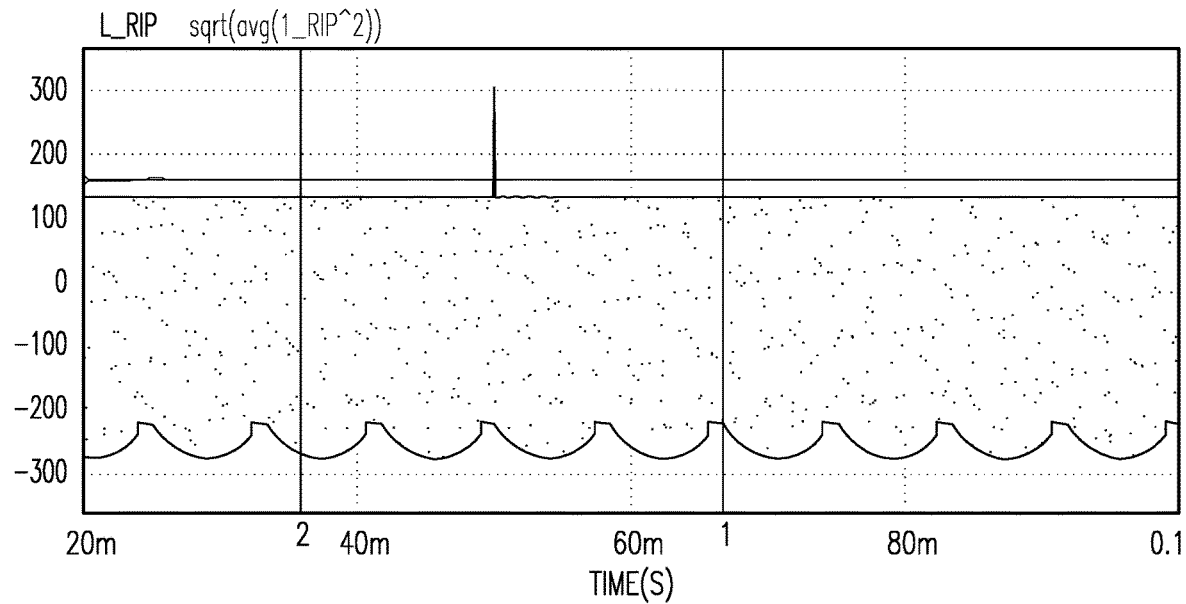
FIG. 7 is a graph illustrating ripple current stress on a DC link.

FIG. 5 is a delta connection of the 3 phase equivalent load. As shown, the coils $V_{1,2}$, $W_{1,2}$, and $U_{1,2}$ are connected in a delta configuration. A phase current/coil current relationship is shown in FIG. 6 and a ripple current stress on the DC link is shown in FIG. 7.

In one example, each coil has a peak current of 100 A. In other words, two coils in parallel means that the delta leg current is 200 A peak. Delta Leg to phase current has a $\sqrt{3}$ relation, specifically, $$i*\sqrt{3}=i\text{peak} \quad (\text{eq. 2})$$

In the given example, $200*\sqrt{3}=346$ $A_{pk}$, which corresponds to 244 A RMS, which matches a calculated result.

At this operating point a 3 phase drive generates an RMS ripple stress of approximately 160 $A_{rms}$. This value matches the rule of thumb for 3 phase inverter which is $$\text{RMS ripple} \approx 0.6*I\text{phase RMS} \quad (\text{eq. 3})$$

Thus, the DC link RMS ripple is calculated as $245*0.6=147$ $A_{rms}$.

Further, a peak current stress on the DC link is +130 A to −270 A, or about 400 A peak-to-peak. The peak-to-peak quantity is important because it represents a larger di/dt, which tends to generate larger overvoltages due to system inductance.

Figure 8:
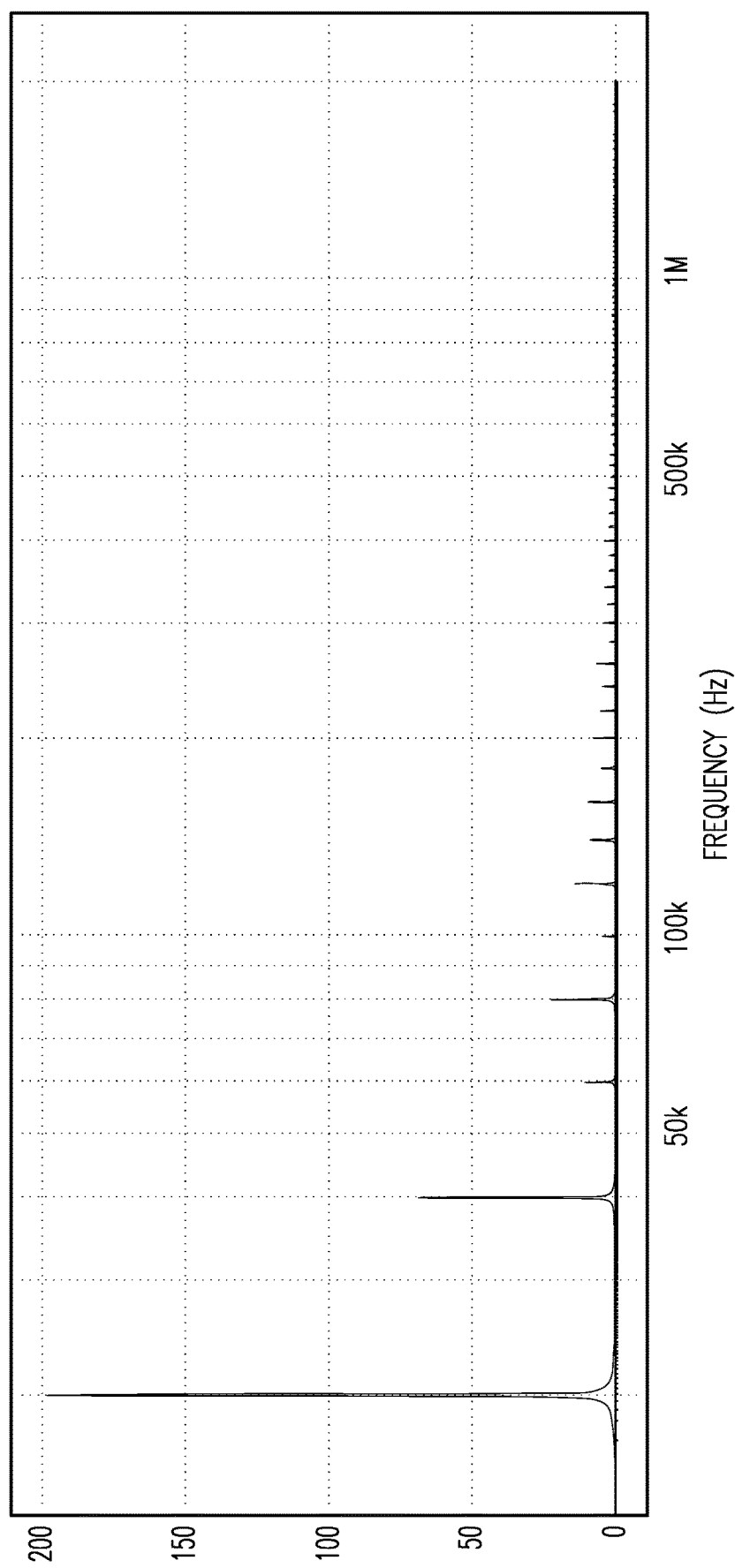
FIG. 8 is a graph illustrating a spectrum of a ripple current in a DC link.

FIG. 8 shows a spectrum of ripple current in a DC link. The spectrum of the ripple current, shown in the frequency domain, shows harmonic content dominant at 20 kHz, which corresponds with 200 A, then 40 kHz, which corresponds with 75 A, and decaying from there.

The frequency relationship in unipolar modulation (H bridge) or common 3 phase bridge PWM methods has the following relationship linking switching frequency of the half bridge legs to the frequency applied to the load.

$$F\_\text{load}=2*F\_PWM \quad (\text{eq. 4})$$

Since the DC link storage element has to supply the combined currents from all the bridge legs, this storage element is exposed to this same frequency of 2*F_PWM.

Series Mode Modulation Configuration

One aspect of the invention provides a series mode modulation configuration. For H bridges a unipolar modulation is utilized that drives the switches at a drive modulation frequency. Unipolar modulation utilizes a zero vector and produces a voltage across the load with a frequency factor of 2×. In other words, in the series mode, the AC voltages across the coils have a frequency factor that is twice the drive modulation frequency. This is a modulation method for 3 phase bridges. In operation, a 10 kHz half bridge frequency applies 20 kHz to the load.

In series mode for a 3-phase application, the coil driver operates as three independent H bridges. This configuration allows each phase to place the PWM signals in a manner such that ripple is reduced.

The series mode coil driver will run twice the current density into a series connected coil, representing twice the torque production in the machine. From a performance stand point, the coil driver is delivering twice the torque of the 3-phase drive, at the expense of a reduction in base speed due to the higher number of effective turns in the machine. Further, when in series mode, the overall load characteristic changes, compared to the same coils parallel connected, the resistance and inductance increases four times, and the induced voltage two times.

Figure 9:
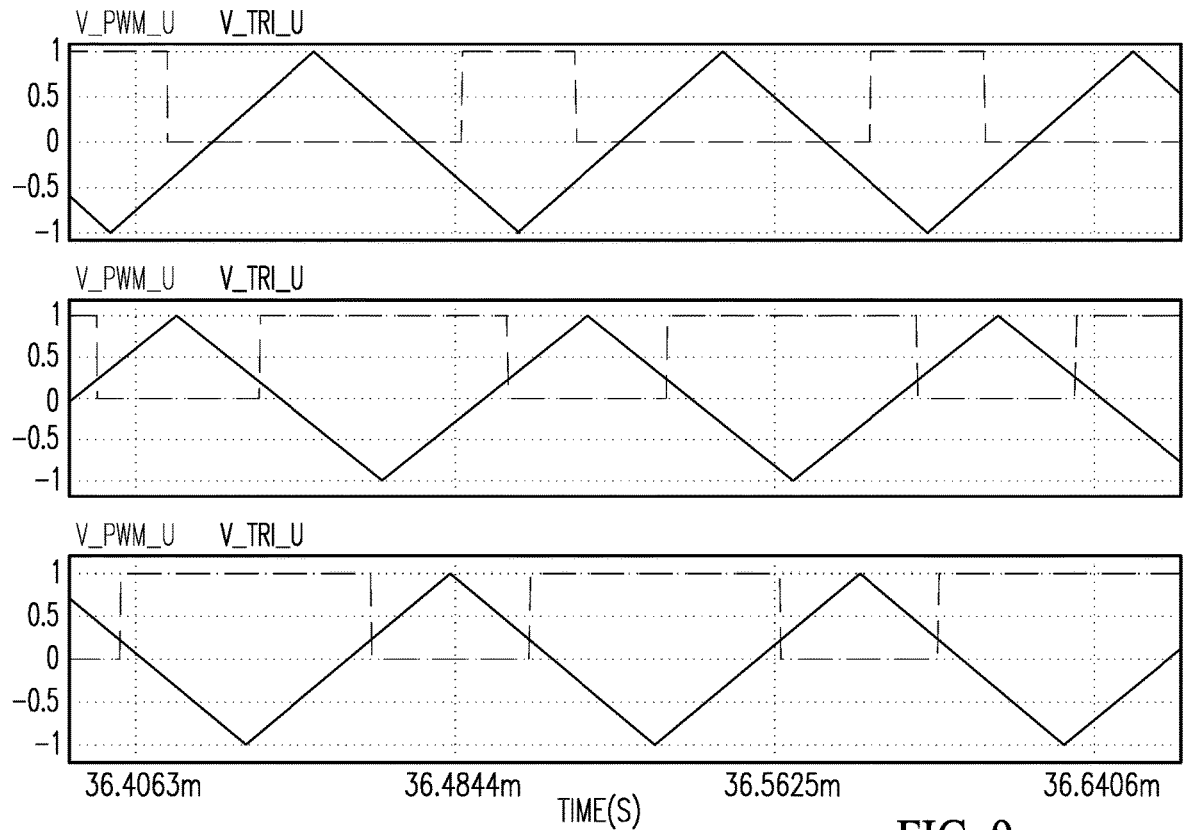
FIG. 9 is a graph illustrating carriers and generated PWM signals.

In a 3-phase system, because each phase is independent, each H bridge gets its own modulator. Each modulator can then be adjusted so the angle of the modulator carrier moves the PWM signals relative to each other as shown in FIG. 9. Intuitively, because this example is a 3-phase system, the angles between carriers should be balanced, i.e., +/−120°. For an n phase system, the angles would be adjusted to represent the characteristics of that system, i.e., carrier angle shift=360/(n phases).

Figure 10:
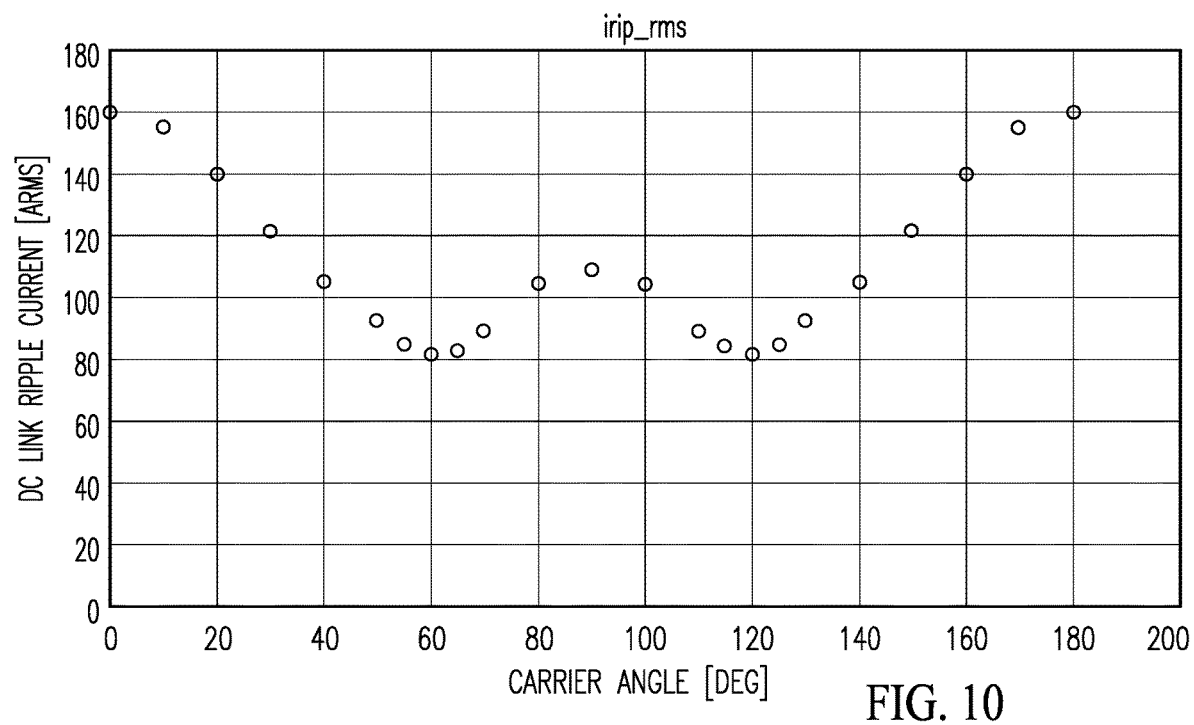
FIG. 10 is a graph illustrating an impact of carrier angle on ripple current.
Figure 11:
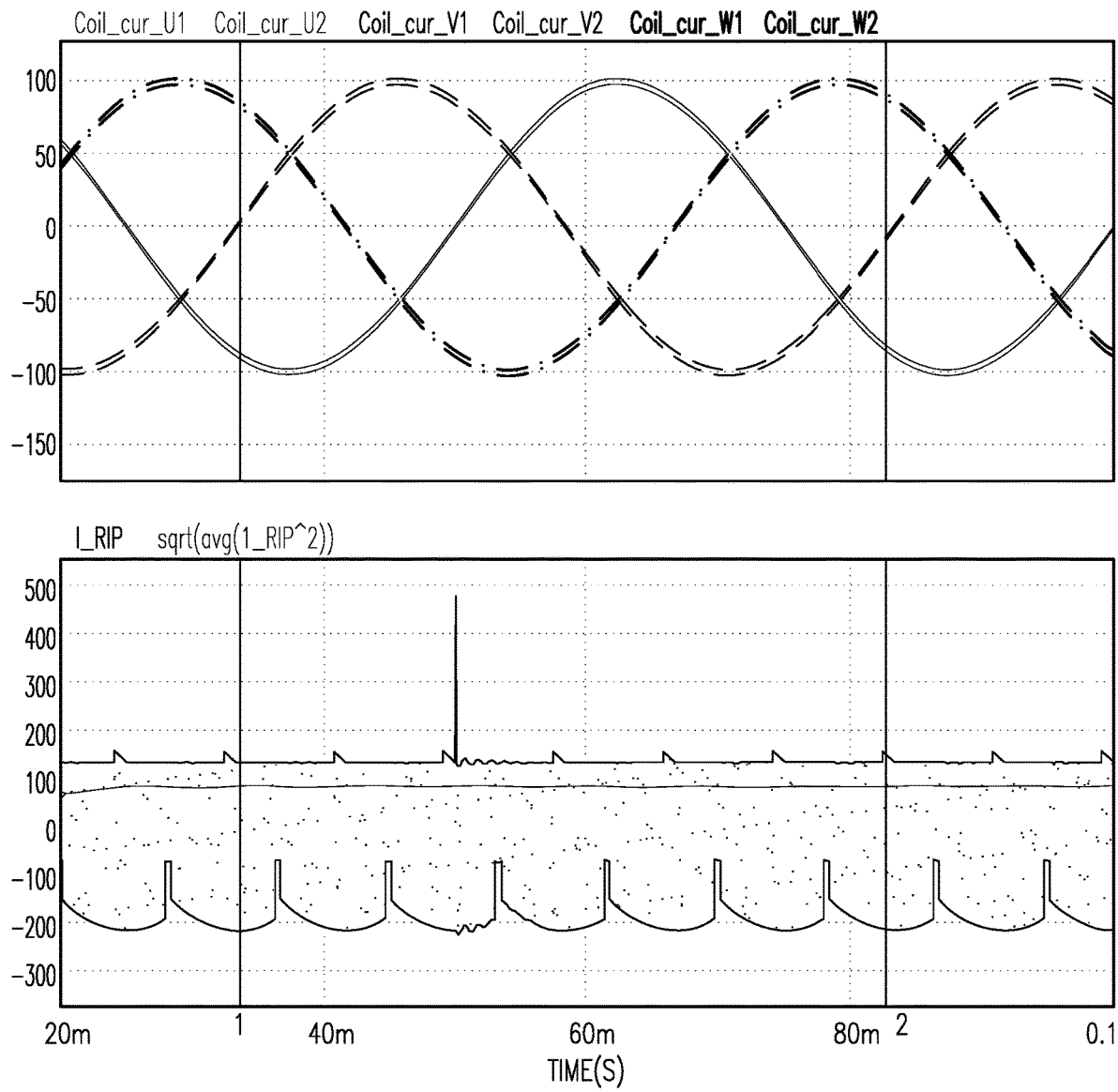
FIG. 11 is a graph illustrating DC link ripple in series mode of operation.

As the angle of the carrier is swept from 0° to 180° the impact on RMS ripple current is shown in in FIG. 10. At 0° or 180° the system behaves like a normal 3-phase drive. It should be noted that a +/−60° offset also provides the same reduction. In addition to the reduction in RMS current stress, FIG. 11 shows the peak-to-peak stress is also reduced from 400 A peak-to-peak to 345 A peak-to-peak.

Figure 12:
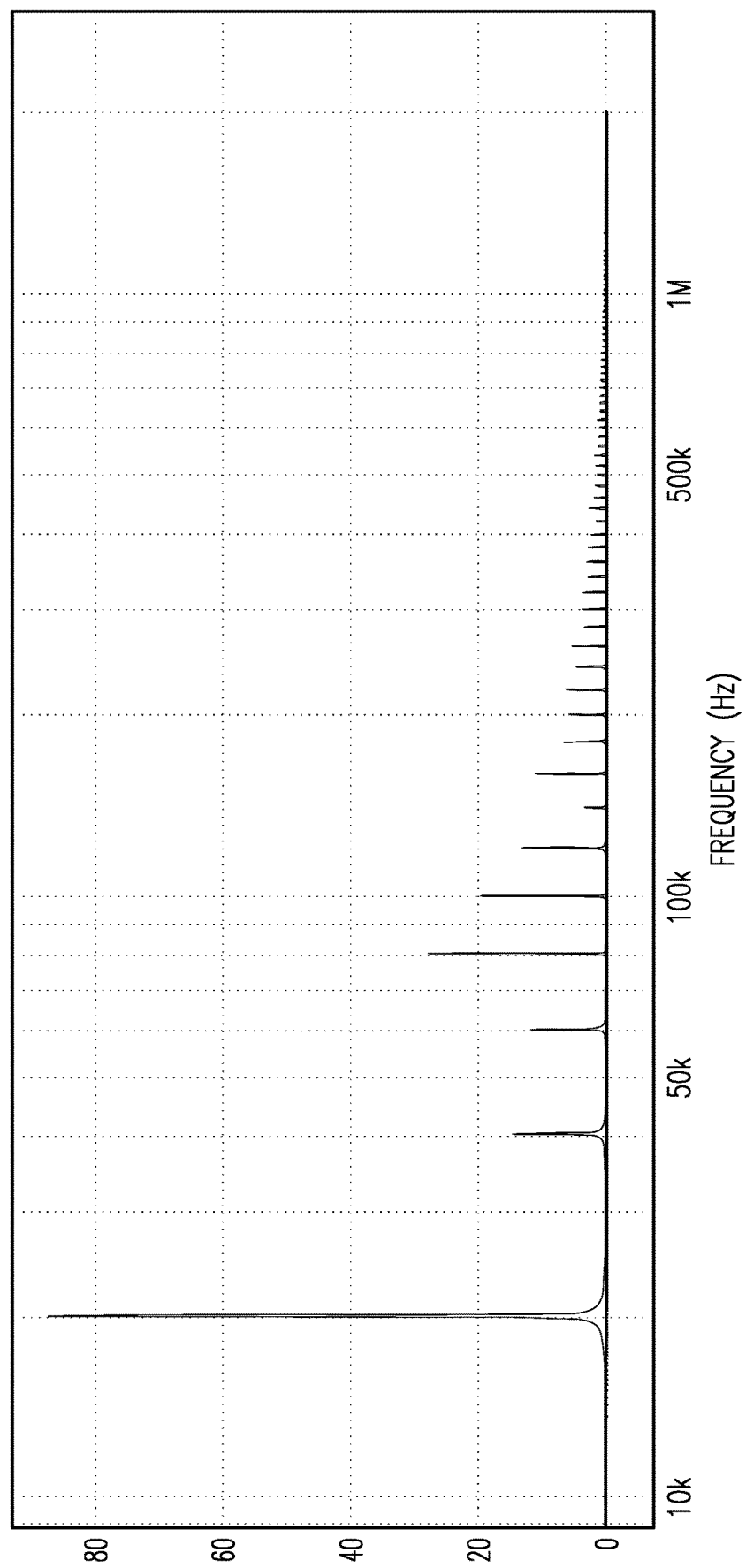
FIG. 12 is a graph illustrating ripple current spectrum of the DC link ripple in the series mode of operation.

The ripple current spectrum of the series mode modulation shown in FIG. 12 showing the effect on the frequency content of the current. The dominant harmonic is still at 20 kHz as shown, but the amplitude is now only 83 A (previously 200 A), the 40 kHz and 60 kHz harmonics are depressed, and the next highest harmonic is at 80 kHz, about 28 A.

Parallel Mode Modulation Configuration

One aspect of the invention is a parallel mode modulation configuration. The parallel mode builds on the series mode modulation. In the parallel mode modulation configuration there are two H bridges driving two coils with identical current. These currents can be interleaved to further reduce the ripple current stress.

Each H bridge uses unipolar modulation. One way to generate this modulation is to use the same reference for each half bridge and provide a carrier with a 180° phase shift. In other words, one carrier is at 0° and the other carrier is at 180° for one H bridge. When the second H bridge is added, the carriers for the two half bridges are then −90° and 90° offset from the first H bridge. Subsequently, for each phase a rotation of +/−120° is applied equally to all four modulators of that phase.

Figure 13:
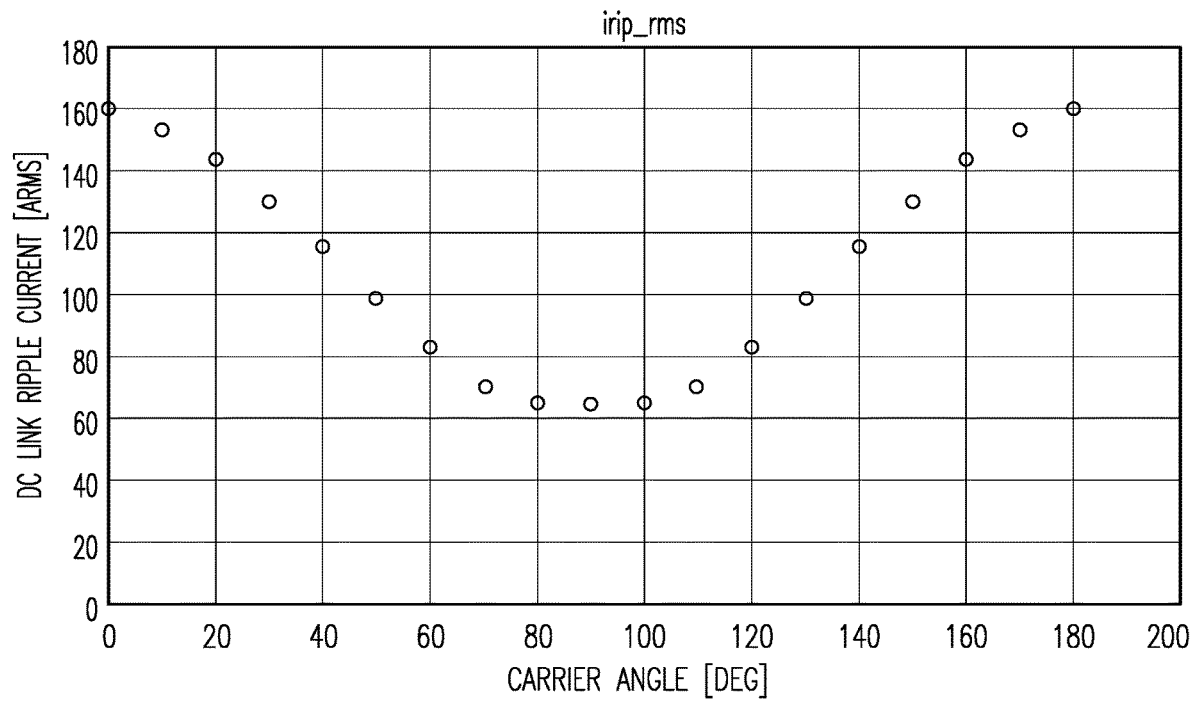
FIG. 13 is a graph showing an effect on DC link ripple when varying carrier angle between H bridges for each phase in a parallel voltage equivalent mode of operation.

FIG. 13 shows the effect on DC link ripple when varying carrier angle between H bridges for each phase in parallel mode when the +/−120° is removed from the series modulation and investigate the effect of only the interleaving when sweeping the interleaving angle. The DC link ripple current is significantly reduced and the best performance is centered on 90° offset.

Figure 14:
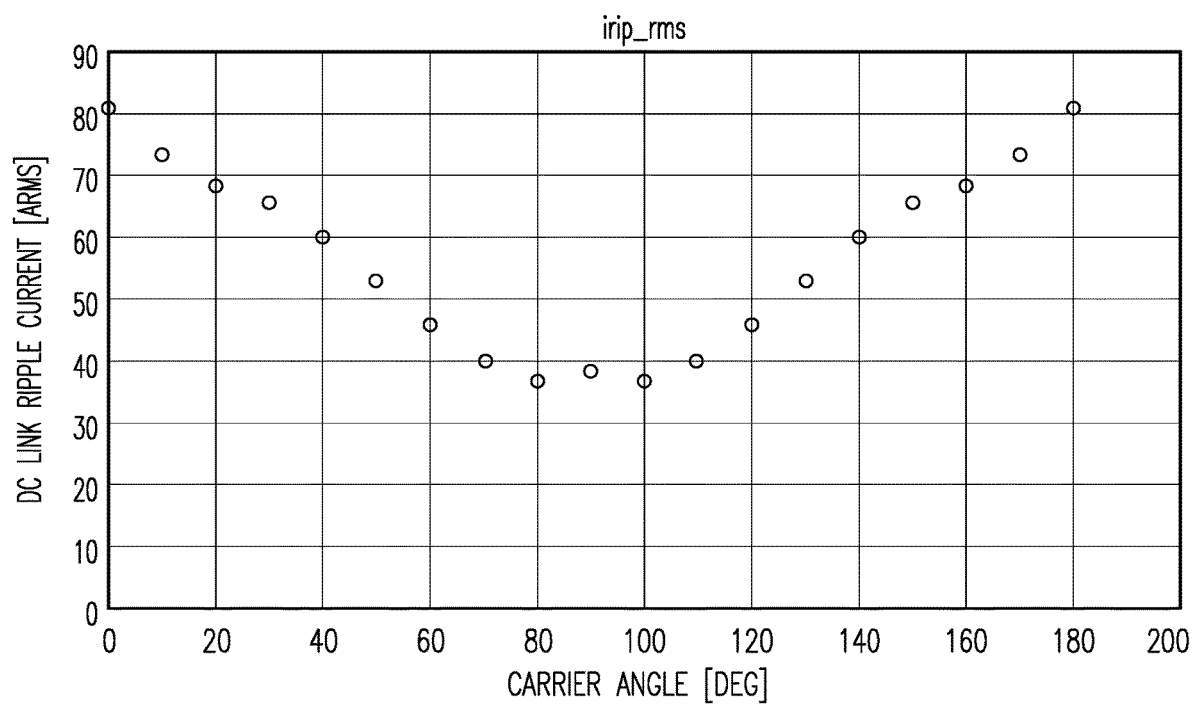
FIG. 14 is a graph showing an impact of a 120° offset and interleaving of H bridge pairs for a given phase.
Figure 15:
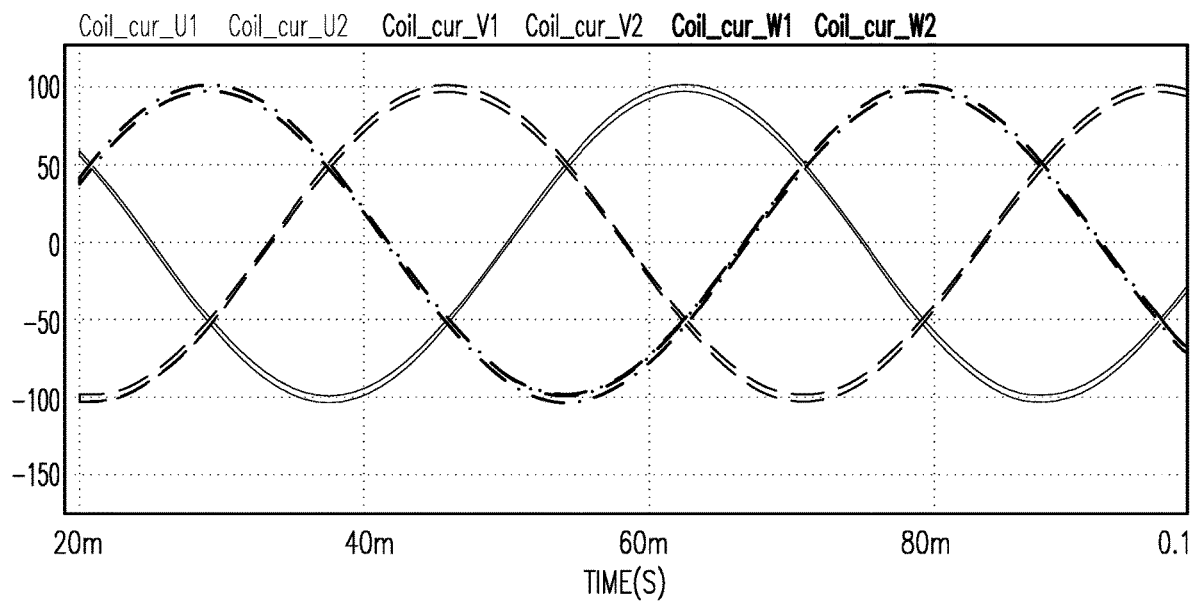
FIG. 15 is a graph illustrating coil currents.
Figure 16:
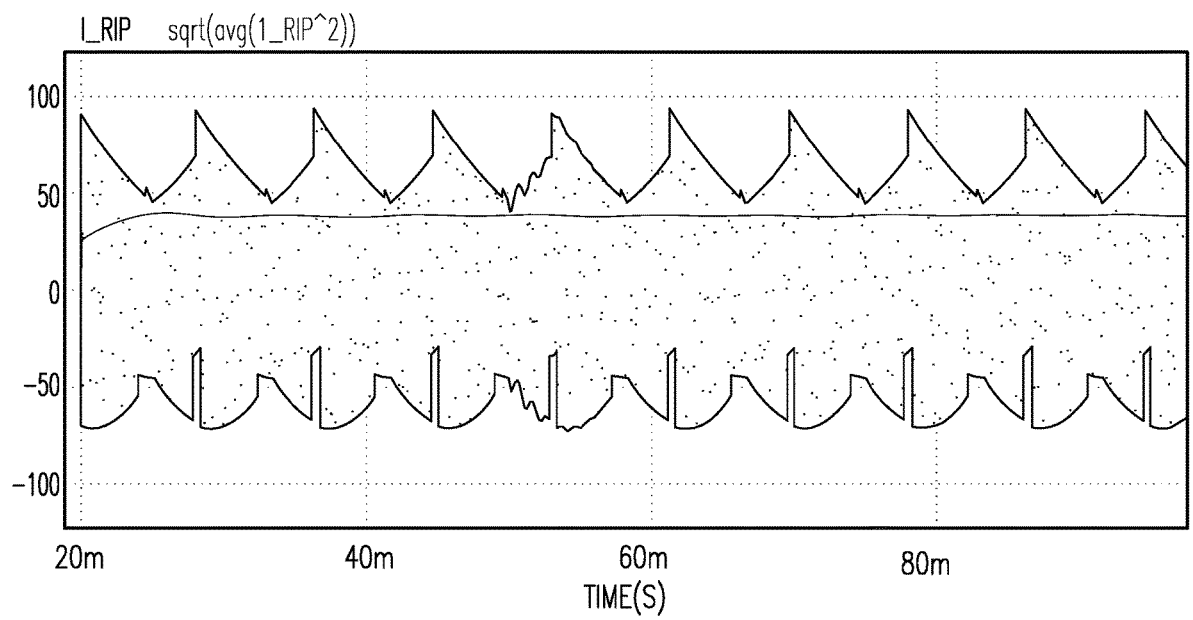
FIG. 16 is a graph illustrating DC link currents when operating in the parallel voltage equivalent mode of operation.
Figure 17:
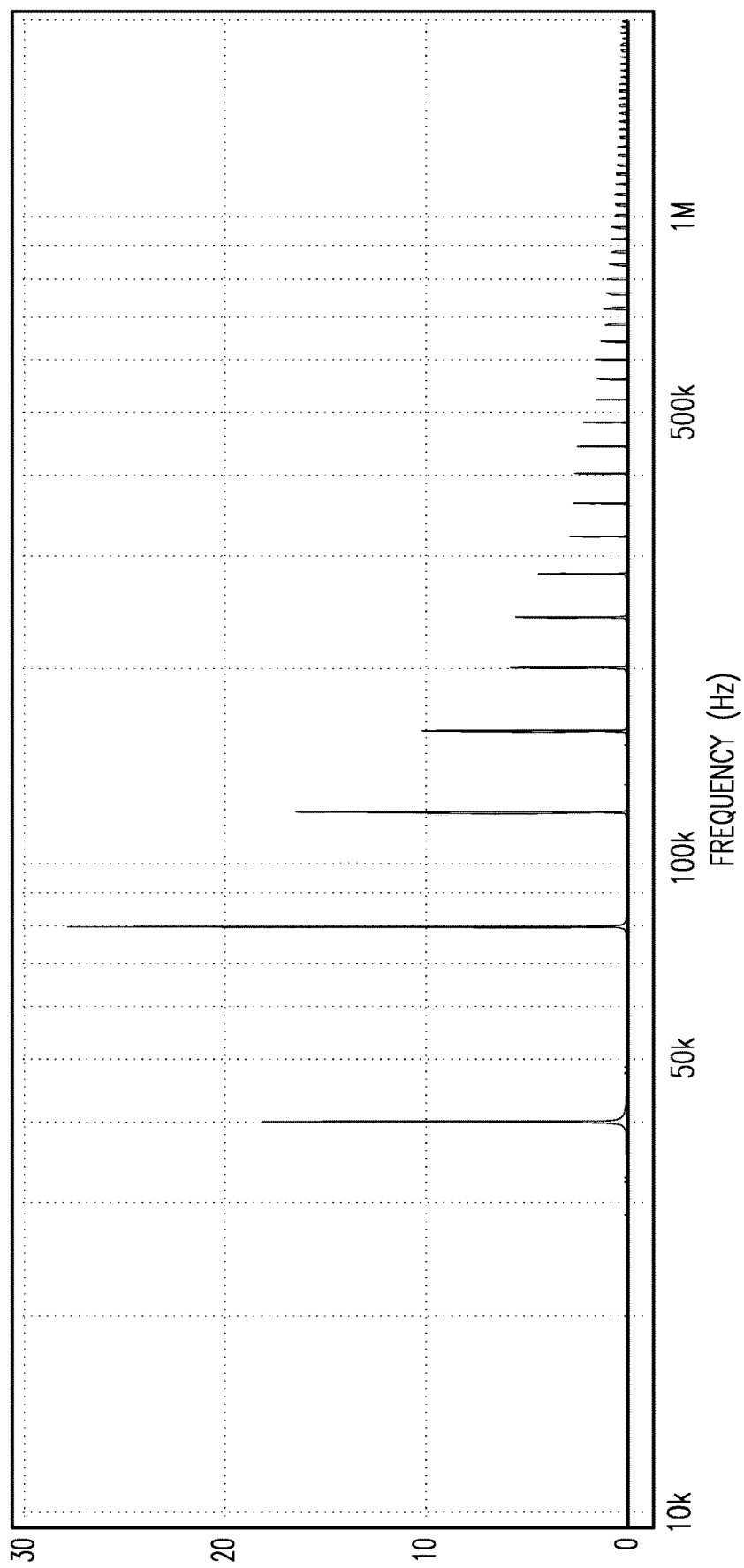
FIG. 17 is a graph illustrating a harmonic content of the DC ripple current during the parallel voltage equivalent mode of operation.

FIG. 14 shows the impact of a 120° offset and interleaving of H bridge pairs. If the 120° offset used in series mode is added, there is a slight increase in DC link ripple current at 90°. Adding the 120° offset and interleaving of H bridge pairs provides two results. First, RMS ripple current is about 38 A RMS, which is reduced from 160 A RMS. Second, Peak-to-peak current is about 150 A. It should be noted that there is a current cancelation happening in the bridges reducing the di/dt applied to the DC link caps, which reduces generated voltage due to inductance. FIG. 15 is a graph showing coil currents and FIG. 16 is a graph showing DC link currents.

When the two H bridges are combined, 90° is not the best value. As seen in FIG. 14, minimum DC link ripple current is minimized at 80° and 100°. A side effect of this asymmetric modulation angle is a significant harmonic content at 20 kHz, and subharmonics on the DC link, the very slight improvement in ripple current in this case is far outweighed by the negative impact of the large harmonic and sub harmonic content. Utilizing the 90° angle completely eliminates 20 kHz harmonic and pushes all the DC link current harmonics up in frequency, and increases the dc ripple current by about 1 A RMS, or more specifically an increase of ~3%.

Combining the disclosed modulation methods reduces the DC link ripple current from 160 A RMS for a conventional inverter delivering the same current, to a little under 40 A RMS for the coil driver. The harmonic content is also quadrupled (20 kHz to 80 kHz) in frequency. The dominant harmonic current is 80 kHz in contrast to 20 kHz of the previous modulation method, given a bridge leg switching frequency of 10 kHz. More generally the harmonic content is increased from 2*F_PWM to 8*F_PWM. The harmonic current at 80 kHz along with the dramatically reduced ripple current greatly simplifies capacitor design.

In the above description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and/or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of physical signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. Aspects of the embodiments can be modified, if necessary, to employ systems, circuits and concepts of the various patents, applications and publications identified herein to provide yet further embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation", "one aspect", or "an implementation" means that a particular feature, structure or characteristic described in connection with the implementation is included in at least one implementation. Thus, the appearances of the phrases "in one implementation", "in an implementation", or "in one aspect" in various places throughout this specification are not necessarily all referring to the same implementation. Furthermore, the particular features, structures, or characteristics may be combined in any suitable manner in one or more implementations.

The headings and abstract provided herein are for convenience only and do not interpret the scope or meaning of the implementations.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method acts that perform substantially the same function in substantially the same way to achieve the same results are within the scope of the invention. Moreover, it should be recognized that structures and/or elements and/or method acts shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system to drive a multiphase electric machine, the multi-phase electric machine having a respective plurality of coils for each phase, the system comprising a respective coil driver for each phase, each coil driver respectively comprising:
   a DC energy store coupled between ports of the coil driver;
   a first switch pair, the first switch pair having at least two switches connected in series between the ports of the coil drive and having a first node between the at least two switches;
   a second switch pair, the second switch pair having at least two switches connected in series between the ports of the coil drive and having a second node between the at least two switches, wherein a first AC drive current or a first AC voltage for a first coil is generated between the first node and the second node;
   a third switch pair, the third switch pair having at least two switches connected in series between the ports of the coil drive and having a third node between the at least two switches;
   a fourth switch pair, the fourth switch pair having at least two switches connected in series between the ports of the coil drive and having a fourth node between the at least two switches, wherein a second AC drive current or a second AC voltage for a second coil is generated between the third node and the fourth node;
   a fifth switch pair, the fifth switch pair having at least two switches connected in series between the second node and the third node;

wherein:
in a first mode, the first switch pair, the fourth switch pair, and the fifth switch pair are in an ON state and the second switch pair and the third switch pair are in an OFF state, and in a second mode the first switch pair, the second switch pair, the third switch pair, and the fourth switch pair are in an ON state, and the fifth switch pair are in an OFF state forming two H bridges, and wherein in the first mode the first and the second AC voltages have a frequency factor that is twice a drive modulation frequency of the switches.

2. The coil driver of claim 1, wherein, in the first mode, a controller varies an angle of a modulator carrier to drive each phase of a pulse width modulated pattern.

3. The coil driver of claim 2, wherein in the first mode, the controller varies the angle of the modulator carrier for each phase by one of +/−120 degrees and +/−60 degrees.

4. The coil driver of claim 1, wherein a controller drives the switches in the first mode such that a number of harmonics between 20 kHz and 80 kHz each have a lower amplitude than a number of harmonics at 20 kHz and 80 kHz.

5. The coil driver of claim 1, wherein in the second mode the two H bridges drive identical currents.

6. The coil driver of claim 5, wherein in the second mode the two identical currents are interleaved.

7. The coil driver of claim 5, wherein in the second mode a controller varies a modulator carrier to drive each coil with a carrier angle offset between at least one of:
60° and 120°, and
80° and 100°.

8. The coil driver of claim 5, wherein in the second mode a controller varies a modulator carrier to drive each phase with a 90° carrier angle offset.

9. The coil driver of claim 8, wherein in the second mode a control circuit drives the switches such that a 20 kHz harmonic is eliminated.

10. The coil driver of claim 7, wherein a control circuit drives the switches such that a dominant harmonic is at 80Khz.

11. The coil driver of claim 8, wherein in the second mode a control circuit drives the switches such that a 2*F_PWM harmonic is eliminated, wherein F_PWM is a pulse width modulation frequency.

12. The coil driver of claim 7, wherein a control circuit drives the switches such that a dominant harmonic is at 8*F_PWM, wherein F_PWM is a pulse width modulation frequency.

13. The coil driver of claim 1, wherein the multiphase electric machine is an induction motor.

14. A method to drive a multiphase electric machine, the multi-phase electric machine having a respective plurality of coils for each phase, the system comprising a respective coil driver for each phase, each coil driver respectively comprising at least a first switch pair, the first switch pair having at least two switches connected in series between ports of the coil drive and having a first node between the at least two switches; a second switch pair, the second switch pair having at least two switches connected in series between the ports of the coil drive and having a second node between the at least two switches, wherein a first AC drive current or a first AC voltage for a first coil is generated between the first node and the second node; a third switch pair, the third switch pair having at least two switches connected in series between the ports of the coil drive and having a third node between the at least two switches; a fourth switch pair, the fourth switch pair having at least two switches connected in series between the ports of the coil drive and having a fourth node between the at least two switches, wherein a second AC drive current or a second AC voltage for a second coil is generated between the third node and the fourth node; a fifth switch pair, the fifth switch pair having at least two switches connected in series between the second node and the third node, the method comprising:

switching the first switch pair, the fourth switch pair, and the fifth switch pair into an ON state and the second switch pair and the third switch pair into an OFF state in a first mode; and switching the first switch pair, the second switch pair, the third switch pair, and the fourth switch pair into an ON state, and the fifth switch pair into an OFF state forming two H bridges in a second mode, wherein in the first mode the first and the second AC voltages have a frequency factor that is twice a drive modulation frequency of the switches.

15. A method of operation of a system to drive a multi-phase electric machine, the multiphase electric machine having a respective plurality of coils for each phase, the system comprising a respective coil driver for each phase, for each phase of a multi-phase electric machine the method comprising:

switching the respective coil driver for each phase of the multiphase electric machine to drive the respective coils for the phase of the multiphase electric machine in one of a series mode and a parallel mode, wherein, the series mode comprises:
driving a respective plurality of coils for each phase; and wherein the parallel comprises:
driving each the plurality of coils for each phase with an identical current by a respective H bridge circuit,
wherein in the first mode a first and a second AC voltages have a frequency factor that is twice a drive modulation frequency of the switches.

16. The coil driver modulation method of claim 15, wherein in the series mode, the method further comprising: driving each phase by signals that are shifted by one of +/−120 degrees and +/−60 degrees.

17. The coil driver modulation method of claim 15, wherein in the parallel mode, the method further comprising: driving each phase with a carrier having an angle offset between at least one of: 60° and 120°, and an additional 90° between modulators of each H bridge pair of each respective phase.

* * * * *